US011537280B2

(12) United States Patent
Han et al.

(10) Patent No.: US 11,537,280 B2
(45) Date of Patent: Dec. 27, 2022

(54) DISPLAY METHOD AND DISPLAY APPARATUS

(71) Applicant: QINGDAO HISENSE MEDIA NETWORKS LTD., Qingdao (CN)

(72) Inventors: Wenbo Han, Qingdao (CN); Xingrui Liu, Qingdao (CN)

(73) Assignee: QINGDAO HISENSE MEDIA NETWORKS LTD., Qingdao (CN)

( * ) Notice: Subject to any disclaimer, the term of this patent is extended or adjusted under 35 U.S.C. 154(b) by 0 days.

(21) Appl. No.: 17/484,123

(22) Filed: Sep. 24, 2021

(65) Prior Publication Data

US 2022/0011929 A1    Jan. 13, 2022

Related U.S. Application Data

(63) Continuation of application No. PCT/CN2020/076697, filed on Feb. 26, 2020.

(30) Foreign Application Priority Data

Sep. 19, 2019  (CN) .......................... 201910885580.X

(51) Int. Cl.
| | | |
|---|---|---|
| *G06F 3/048* | (2013.01) | |
| *G06F 3/04845* | (2022.01) | |
| *G06F 3/0481* | (2022.01) | |
| *G06T 3/40* | (2006.01) | |
| *G06T 3/60* | (2006.01) | |

(52) U.S. Cl.
CPC ........ *G06F 3/04845* (2013.01); *G06F 3/0481* (2013.01); *G06T 3/40* (2013.01); *G06T 3/60* (2013.01)

(58) Field of Classification Search
CPC ....... G06T 11/60; G06T 3/60; G06F 3/04842; G06F 3/017; G06F 3/0488; G06F 3/0486; G06F 2203/04806; G06F 3/04845
See application file for complete search history.

(56) References Cited

U.S. PATENT DOCUMENTS

| | | | | |
|---|---|---|---|---|
| 6,414,716 B1 * | 7/2002 | Kawai | ................ | H04N 5/23299 |
| | | | | 348/211.3 |
| 9,569,078 B2 * | 2/2017 | Cherna | ................... | G06T 11/60 |

(Continued)

FOREIGN PATENT DOCUMENTS

| | | |
|---|---|---|
| CN | 101778216 A | 7/2010 |
| CN | 102202168 A | 9/2011 |

(Continued)

OTHER PUBLICATIONS

Kumar et al., The HotMedia Archtechture: Progressive and Interactive Rich Media for Internet, 2001; IEEE, 15 pages.*

(Continued)

*Primary Examiner* — Linh K Pham
(74) *Attorney, Agent, or Firm* — Workman Nydegger

(57) ABSTRACT

The disclosure provides a display method. The method includes: presenting a first partial image of a current display frame of a media object on a refreshed user interface in response to a user input for enlarging the media object for display; where the refreshed user interface further includes a thumbnail show window for presenting a position of the first partial image of the current display frame in the current display frame.

15 Claims, 13 Drawing Sheets

(56) References Cited

U.S. PATENT DOCUMENTS

| | | | | |
|---|---|---|---|---|
| 10,705,687 | B1* | 7/2020 | Pace | G06F 3/04817 |
| 10,901,589 | B1* | 1/2021 | Gilra | G06F 3/0484 |
| 10,929,208 | B1* | 2/2021 | Vatev | G06F 40/166 |
| 2004/0257436 | A1* | 12/2004 | Koyanagi | H04N 7/18 |
| | | | | 348/E7.087 |
| 2006/0195876 | A1* | 8/2006 | Calisa | G08B 13/19682 |
| | | | | 348/E7.086 |
| 2008/0129649 | A1* | 6/2008 | Shelby | G06F 1/1607 |
| | | | | 345/1.3 |
| 2014/0282159 | A1* | 9/2014 | Lee | G06F 3/0481 |
| | | | | 715/768 |
| 2016/0255268 | A1* | 9/2016 | Kang | G06F 3/04847 |
| | | | | 348/333.11 |
| 2016/0269677 | A1* | 9/2016 | Lee | H04N 21/42204 |
| 2018/0262708 | A1* | 9/2018 | Lee | H04N 21/475 |
| 2019/0045135 | A1* | 2/2019 | Ryu | H04N 5/23216 |
| 2019/0163354 | A1* | 5/2019 | Ikuta | G06F 3/0482 |

FOREIGN PATENT DOCUMENTS

| | | |
|---|---|---|
| CN | 104731480 A | 6/2015 |
| CN | 105512136 A | 4/2016 |
| CN | 106055247 A | 10/2016 |
| CN | 107567713 A | 1/2018 |
| CN | 108427589 A | 8/2018 |
| CN | 109937569 A | 6/2019 |

OTHER PUBLICATIONS

Holthe et al., Video Browsing Techniques for Web Interfaces, 2005, IEEE; 5 pages.*

Lee et al., The Embedded Zooming Applications for Personal Digital Assistants; 2003; IEEE, 8 pages.*

Chinese Office Action, dated Oct. 26, 2022, from Chinese Application No. 201910885580.X.

* cited by examiner

1401 — In response to receiving an instruction associated with a key on the remote controller, the UI of the display apparatus determines whether a monitor event corresponding to the instruction and a key value associated with the key have been registered; if it is determined the monitor event corresponding to the instruction and the key value have been registered, the flow goes to the subsequent steps, and if it is determined that a monitor event corresponding to the instruction and the key value have not been registered, the instruction will not be responded

1402 — UI of the display apparatus determines the image displayed in the image display area after the rotation according to the rotation angle and rotation direction, and invokes the service support layer to refresh the image display area to display the rotated image

1403 — The UI of the display apparatus rotates the image thumbnail in the thumbnail show window according to the rotation angle and rotation direction, and re-adjusts the width and height of the rotated thumbnail according to the height of the thumbnail frame in the thumbnail show window so that the width of the rotated thumbnail and the height of the thumbnail frame are equal, and adjusts the width and height of the display area of the image thumbnail accordingly

1404 — The UI of the display apparatus invokes the browser in the service support layer to refresh the thumbnail show window according to the calculated width and height of the thumbnail in the thumbnail show window, the rotation direction and rotation angle, and the width and height of the display area

FIG. 14

DISPLAY METHOD AND DISPLAY APPARATUS

CROSS-REFERENCE TO RELATED APPLICATIONS

The present application is a continuation of International Application No. PCT/CN2020/076697 filed Feb. 26, 2020, which claims the benefit and priority of Chinese Patent Application No. 201910885580.X filed Sep. 19, 2019. The entire disclosures of the above applications are incorporated herein by reference.

FIELD

The present disclosure relates to the display technology, and in particular to a display method and a display apparatus.

BACKGROUND

This section provides background information related to the present disclosure which is not necessarily prior art.

At present, since the display apparatuses (such as smart TVs) can provide users with playback images for audio, video, images, etc., they have attracted widespread attention. With the developments of big data and artificial intelligence, the users' demands for the functions of display apparatuses are increasing day by day.

In order to meet the increasing demands of users, the Web techniques such as HTML5 are currently used for multimedia service development to make user interface more flexible.

Taking a smart TV as an example, the smart TV currently supports to enlarge an image, and allows to display the enlarged image in other area by moving the image through operations on the keys of a remote controller.

How to improve user's experience during enlargement of an image on the display apparatus is an issue for considerations at present.

SUMMARY

This section provides a general summary of the disclosure, and is not a comprehensive disclosure of its full scope or all of its features.

In a first aspect, a display apparatus is provided. The display apparatus includes: a display and a controller in communication with the display. The display is configured to display a user interface, where the user interface is configured to present a media object. The controller, is configured to cause the display to: display the media object on the user interface; in response to a user input for enlarging the media object, present a first partial image of the media object in a current display frame on a refreshed user interface; wherein the refreshed user interface further comprises a thumbnail show window for indicating a position of the first partial image in the current display frame.

In a second aspect, a display method is provided. The method includes: displaying a media object on a user interface of a display apparatus; in response to a user input for enlarging the media object, presenting a first partial image of the media object in a current display frame on a refreshed user interface; wherein the refreshed user interface further comprises a thumbnail show window for indicating a position of the first partial image in the current display frame.

In a third aspect, a non-transitory computer-readable storage medium is provided, on which computer instructions are stored, where the computer instructions implement the method as described in the above second aspect when executed by a processor.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 14 illustrates a schematic diagram of a process of rotating and displaying an image according to some embodiments.

Corresponding reference numerals indicate corresponding parts or features throughout the several views of the drawings.

DETAILED DESCRIPTION

Figure 1:
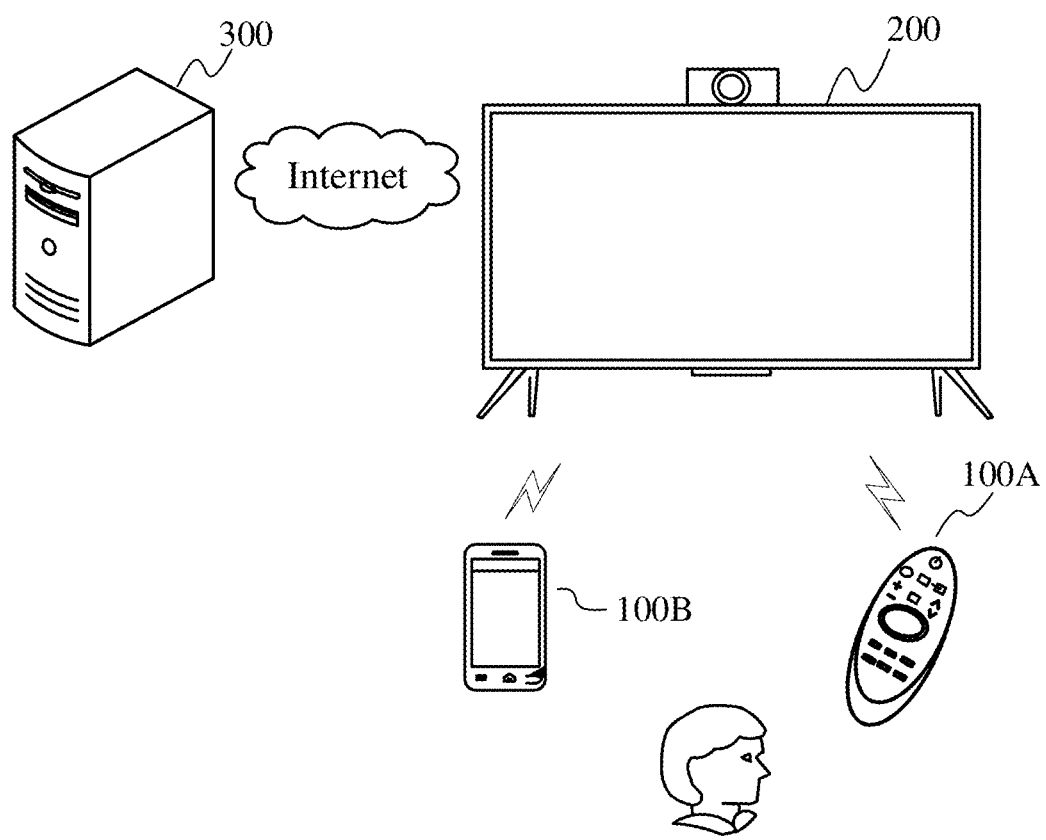
FIG. 1 illustrates a schematic diagram of an operation scenario between a display apparatus and a control device according to some embodiments.

Example embodiments will now be described more fully with reference to the accompanying drawings.

At present, the smart TV supports the function of enlarging an image when playing the image, and the function to display the enlarged image in other area by moving the image through operations on the keys of the remote controller. However, after the image is enlarged, it tends to exceed the display area of the display screen, which causes a user to be unable to view the whole image and the user does not know the specific position of the displayed part in the whole image.

At least for the above-mentioned issue, the disclosure discloses a display method and a display apparatus. During the enlargement of an media object (such as an image), a certain part of the enlarged media object is displayed on the display screen, and the specific position of the currently displayed part in the whole area of the media object is shown by a thumbnail show window.

Here, the media object may be an image, video or animation, which is not limited in the disclosure.

The terms involved in the disclosure will be described below with reference to the drawings. It should be noted that the following description of all the terms is only to make the content of the disclosure easier to understand, and does not intend to limit the protection scope of the disclosure.

The term "remote controller" used in the embodiments of the disclosure refers to a component of an electronic device (such as the display apparatus disclosed in the disclosure), which can generally control the electronic device wirelessly within a relatively short distance range. This component may generally be connected to the electronic device by using at least one of infrared ray, Radio Frequency (RF) signal, Bluetooth and other communication methods, and may also include the WiFi, wireless Universal Serial Bus (USB), Bluetooth, motion sensor and other functional modules. For example, a handheld touch remote uses a user interface in the touch screen to replace most of the physical built-in physical keys in the general remote controller.

The term "hardware system" used in the embodiments of this disclosure may refer to an entity component comprising mechanical, optical, electrical and magnetic devices such as Integrated Circuit (IC), Printed Circuit Board (PCB) or the like and has the computing, control, storage, input and output functions. In various embodiments of the disclosure, the hardware system may also be called motherboard or chip.

The HTML (HyperText Markup Language) technology is a standard markup language for creating a webpage, where the webpage is described by the markup tag. The HTML tag comprises keywords identified by < > to indicate text, graphic, animation, sound, table, link, etc. The Web browser will read the HTML document, parse the content of the tags in the document, and display it in the form of webpage.

The CSS (Cascading Style Sheet) technology is a computer language used to express the HTML file style, and is a language that may be used to define the style structure such as font, color, position or the like. The CSS style may be stored directly in the HTML web page or in individual style file to control the styles in web pages.

The JavaScript is a language used in the Web page programming, and may be inserted into the HTML page and interpreted and executed by the browser, wherein the interaction logics of the web pages or applications based on the Web technology are all implemented through the JavaScript. The JavaScript may encapsulate the JavaScript extension interface through the browser service support layer to realize the communication with the underlying operating system platform, and invoke the underlying player to realize user's media files playing.

The Vue framework is a web application framework for creating user interfaces, which allows for more lightweight and rapid service development based on the HTML, CSS, JavaScript and other technologies, may easily create web applications, and has more functions, such as monitoring page data changes and dynamically changing the page display according to the page data changes. The use of the Vue framework can meet more complex requirements and functions of the UI services of the display apparatus.

FIG. 1 illustrates a schematic diagram of an operation scenario between a display apparatus and a control device according to some embodiments. As shown in FIG. 1, a user may operate a display apparatus 200 through a control device (100A, 100B).

Here, the control device may be a remote controller 100A. In some embodiments, the remote controller 100A is used to control the display apparatus 200 wirelessly. For example, the remote controller may communicate with the display apparatus 200 through the infrared protocol, Bluetooth protocol, ZigBee protocol or other short-range communication method. In some embodiments, the remote controller 100A is used to control the display apparatus 200 by other wired methods. The user may input user commands through the keys on the remote, or by voice, or panel touch, etc. to control the display apparatus 200. For example, the user may input the corresponding commands through the volume+/− keys, channel control keys, up/down/left/right direction keys, voice input keys, menu key, power key, etc. on the remote to control the functions of the display apparatus 200.

The control device may also be a smart device, such as mobile terminal 100B, tablet computer, computer, laptop, etc., which may communicate with the display apparatus 200 through a Local Area Network (LAN), a Wide Area Network (WAN), a Wireless Local Area Network (WLAN) or other networks. The smart device controls the display apparatus 200 through an application corresponding to the display apparatus 200. For example, an application running on the smart device is used to control the display apparatus 200. This application may provide the user with various controls through an intuitive User Interface (UI) on the screen associated with the smart device.

Exemplarily, both the mobile terminal 100B and the display apparatus 200 can install software applications, so that the connection and communication between them may be achieved through the network communication protocols, thereby achieving the purpose of one-to-one control operation and data communication. For example, the mobile terminal 100B and the display apparatus 200 may establish a control instruction protocol, where the remote controller keyboard is synchronized onto the mobile terminal 100B, and the function of controlling the display apparatus 200 is realized by controlling the user interface on the mobile terminal 100B; and the audio and video content displayed on the mobile terminal 100B may also be transmitted to the display apparatus 200 to realize the synchronous display function.

As shown in FIG. 1, the display apparatus 200 may further perform the data communication with a server 300 through various communication methods. In various embodiments of the disclosure, the display apparatus 200 may be allowed to communicate with the server 300 through the local area network, wireless local area network, or other networks. The server 300 may provide various contents and interactions to the display apparatus 200.

Exemplarily, the display apparatus 200 receives the software updates, or accesses a remotely stored digital media library, by sending and receiving the information and the Electronic Program Guide (EPG) interaction.

The display apparatus 200 may be a liquid crystal display, an Organic Light Emitting Diode (OLED) display, a projection display apparatus, or a smart TV. The specific type, size, resolution, etc. of the display apparatus are not limited, and those skilled in the art may understand that some changes may be made in the performance and configuration of the display apparatus 200 as needed. In some embodiments, the display apparatus may not have TV broadcast reception function.

The display apparatus 200 may additionally provide the smart network TV function which computers support. Exemplarily, it includes: network TV, smart TV, Internet Protocol TV (IPTV), etc.

Figure 2:
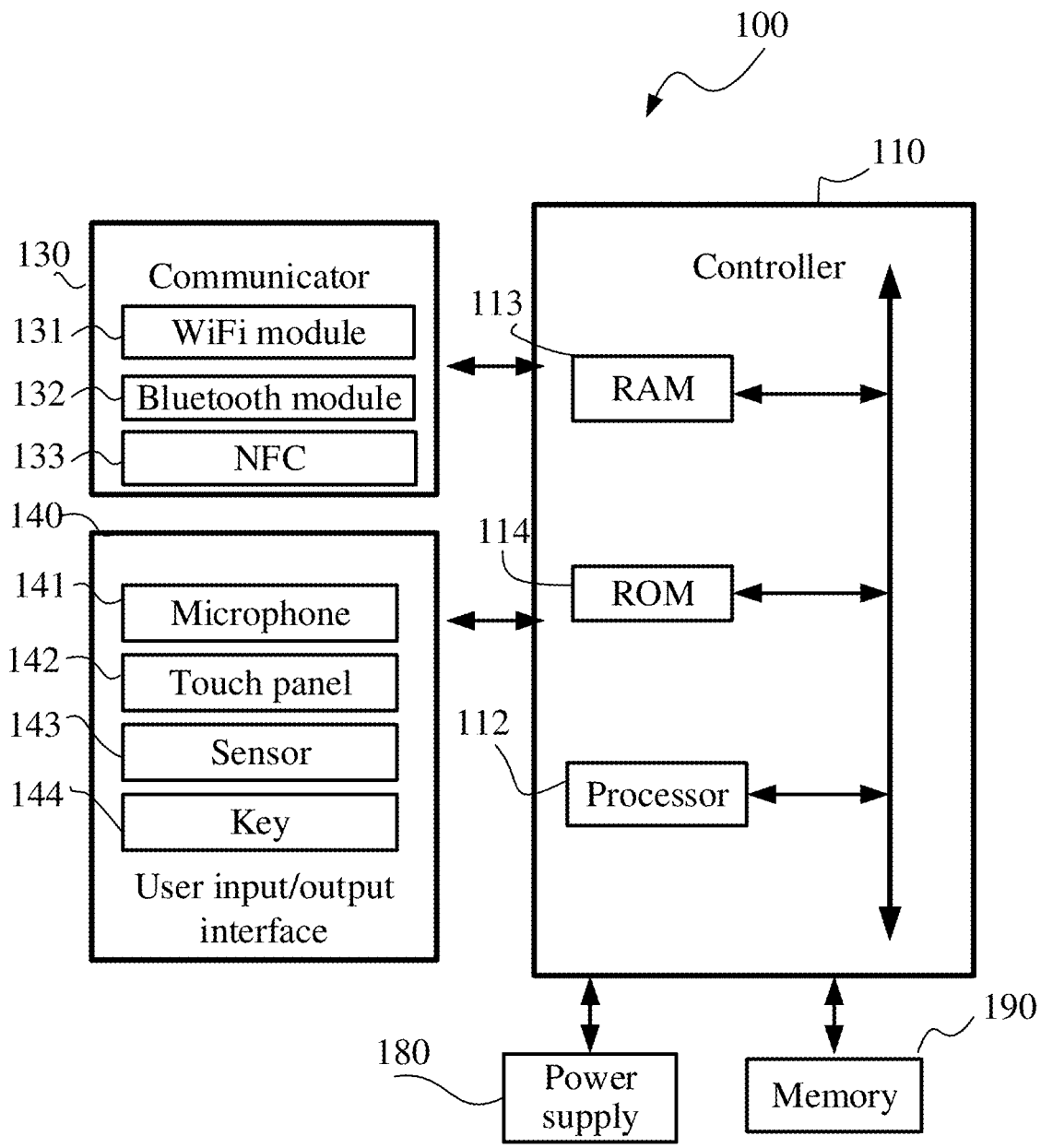
FIG. 2 illustrates a block diagram of the hardware configuration of the control device 100 according to some embodiments.

FIG. 2 illustrates a configuration block diagram of a control device 100 according to some embodiments, where the control device 100 may be the remote controller 100A or the mobile terminal 100B. As shown in FIG. 2, the control device 100 includes a controller 110, a communicator 130, a user input/output interface 140, a memory 190, and a power supply 180.

The control device 100 is configured to control the display apparatus 200, receive operation commands from a user, and convert the operation commands into instructions that can be recognized and responded by the display apparatus 200, serving as an intermediary between the user and the display apparatus 200. For example, the user operates the channel+/−keys on the control device 100, and the display apparatus 200 responds to the channel+/−operations.

In some embodiments, the control device 100 may be a smart device. For example, the control device 100 may install various applications for controlling the display apparatus 200 according to the user requirement.

In some embodiments, as shown in FIG. 1, the mobile terminal 100B or another smart electronic device may perform the function similar to the control device 100 after installing an application that manipulates the display apparatus 200. For example, the user may provide various function keys or virtual keys of the graphical user interface on the mobile terminal 100B or another smart electronic device by installing applications, to realize the functions of the physical keys of the control device 100.

The controller 110 includes a processor 112, an RAM 113, an ROM 114, a communication interface, and a communication bus. The controller 110 is used to control the running and operations of the control device 100, and the communication cooperation among internal components as well as the external and internal data processing functions.

The communicator 130 realizes the communications of control signals and data signals with the display apparatus 200 under the control of the controller 110. For example, the received user input signal is sent to the display apparatus 200. The communicator 130 may include at least one of a WiFi module 131, a Bluetooth module 132, a Near Field Communication (NFC) module 133 and other communication modules.

In the user input/output interface 140, the input interface includes at least one of a microphone 141, a touch panel 142, a sensor 143, a key 144 and other input interfaces. For example, the user may realize the user command input function through voice, touch, gesture, press and other actions, and the input interface converts the received analog signal to a digital signal, converts the digital signal to a corresponding command signal, and sends it to the display apparatus 200.

In some embodiments, the control device 100 includes at least one of the communicator 130 and the output interface. The communicator 130 is configured in the control device 100, such as WiFi, Bluetooth, NFC or another module, which can encode the user input instruction through the WiFi protocol or Bluetooth protocol or NFC protocol, and then send it to the display apparatus 200.

The memory 190 is used to store various operating programs, data, and applications that drive and control the control device 100 under the control of the controller 110. The memory 190 may store various kinds of control signal instructions input from a user.

The power supply 180 is used to provide operating power support for all the elements of the control device 100 under the control of the controller 110. It may be a battery and a related control circuit.

Figure 3:
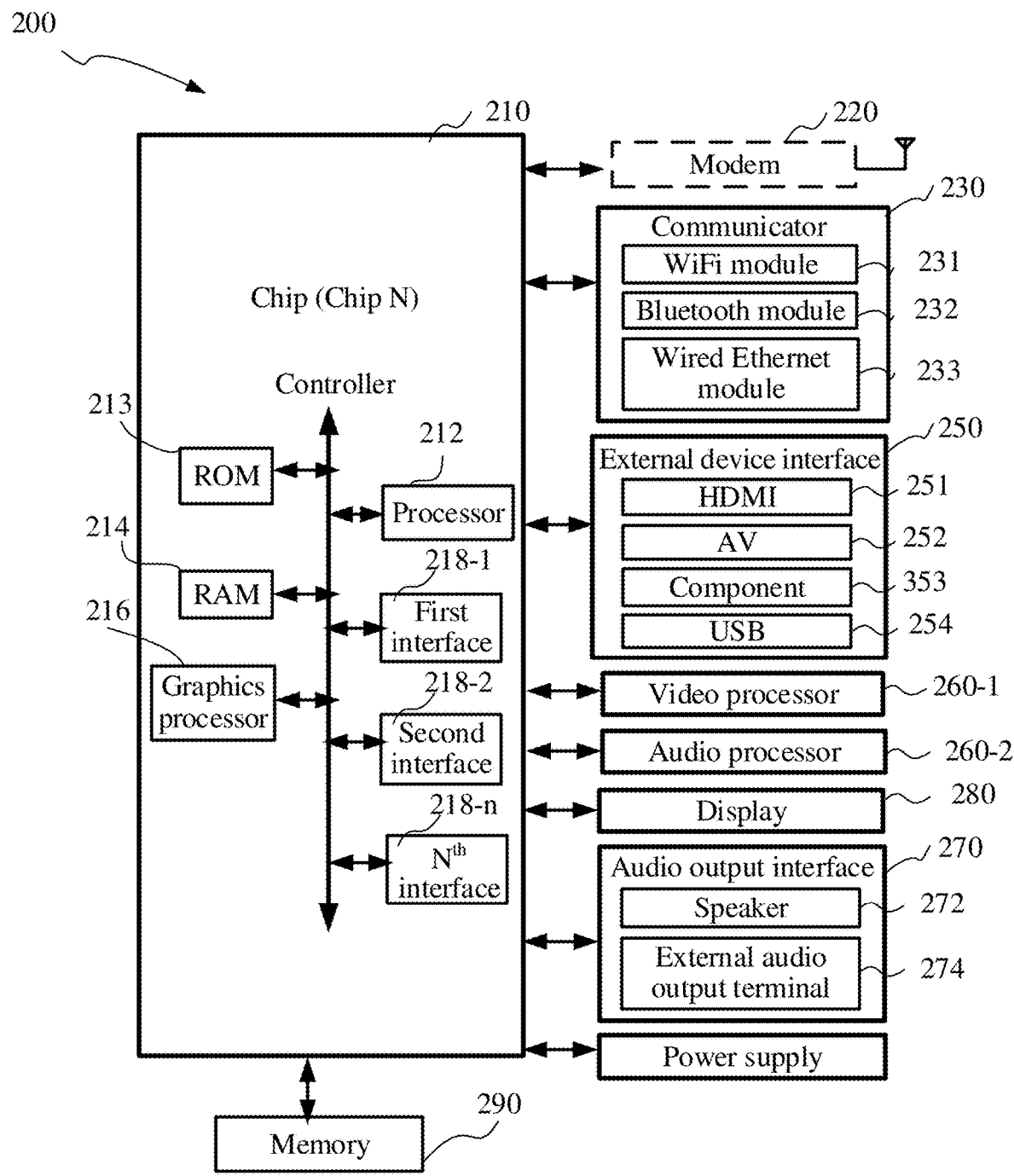
FIG. 3 illustrates a block diagram of the hardware configuration of the display apparatus 200 according to some embodiments.

FIG. 3 illustrates a block diagram of the hardware configuration of the hardware system in the display apparatus 200 according to some embodiments, where the block diagram of the hardware configuration is described by taking a single hardware system architecture as an example.

It should be noted that FIG. 3 is merely an exemplary description of the single hardware system architecture of the disclosure, and does not intend to limit this in the disclosure. In practical applications, a single system may include more or less hardwares or interfaces as needed.

As shown in FIG. 3, the hardware system of the display apparatus 200 may include an chip N and modules connected to the chip N via various interfaces.

The chip N may include a modulator-demodulator 220, a communicator 230, an external device interface 250, a controller 210, a memory 290, a user input interface, a video processor 260-1, an audio processor 260-2, a display 280, an audio output interface 272, and a power supply. In other embodiments, the Chip N may also include more or less modules.

The display apparatus 200 may establish the connections of control signals and data signals with an external control device or content provider device through the communicator 230. For example, the communicator 230 may receive the control signal of the remote controller 100 under the control of the controller.

The external device interface 250 is a component that provides the data transmission between the controller of Chip N 210 and the chip A and other external devices. The external device interface may be connected with external devices such as set-top box, game device, laptop, etc. in a wired and/or wireless manner, and may receive the data such as video signals (e.g., moving images), audio signals (e.g., music), additional information (e.g., EPG), etc. from the external devices.

Here, the external device interface 250 may include: any one or more of a High-Definition Multimedia Interface (HDMI) interface 251, a Composite Video Blanking Synchronization (CVBS) interface 252, an analog or digital component interface 253, a Universal Serial Bus (USB) interface 254, Red-Green-Blue (RGB) interface (not shown in the figure), etc. The disclosure does not limit the number and type of external device interfaces.

The controller 210 controls the operations of the display apparatus 200 and responds to the user's operations by running various software programs (such as operating system and/or various applications) stored on the memory 290.

As shown in FIG. 3, the controller 210 includes a Read Only Memory (ROM) 213, a Random Access Memory (RAM) 214, a graphics processor 216, a CPU processor 212, communication interfaces (218-1, 218-2, ..., 218-n), and a communication bus, wherein the RAM 213, ROM 214, graphics processor 216, CPU processor 212, and communication interfaces 218 are connected through the bus.

The graphics processor 216 is used to generate various graphics objects, such as icons, operation menus, graphics for user's instruction input, etc. It includes an arithmetic unit, which performs the operations by receiving various interactive instructions input from users, and displays various objects according to the display attributes. And it includes a renderer, which generates the rendering result of various objects obtained based on the arithmetic unit, for displaying on the display 280.

The CPU processor 212 is used to execute the operating system and application instructions stored in the memory 290, and execute various applications, data and content according to various interactive instructions received from the outside so as to finally display and play various audio and video contents.

In some exemplary embodiments, the CPU processor 212 may include multiple processors. The multiple processors may include a main processor and one or more sub-processors.

The communication interfaces may include a first interface 218-1 to an $n^{th}$ 218-n. These interfaces may be network interfaces connected to external devices via a network.

The controller 210 may control the overall operation of the display apparatus 200. For example, in response to receiving a user command for selecting a UI object displayed on the display 280, the controller 210 may perform the operations related to the object selected by the user command.

The memory 290 includes various software modules for driving and controlling the display apparatus 200. For example, various software modules stored in the memory 290 include: a basic module, a detection module, a communication module, a display control module, a browser module, and various service modules, etc.

Meanwhile, the memory 290 is further used to store the received external data and user data, images of various items in various user interfaces, and visual effect graphics of focus objects, etc.

In some embodiments, the user may input a user command on the Graphical User Interface (GUI) displayed on the display 280, and the user input interface receives the user input command through the Graphical User Interface (GUI). Alternatively, the user may input a user command by inputting the particular sound or gesture, and the user input interface recognizes the sound or gesture through the sensor to receive the user input command.

The video processor 260-1 is used to receive the video signal and perform the video data processing according to the standard codec protocol of the input signal, to obtain the video signal that can be displayed or played directly on the display 280.

Exemplarily, the video processor 260-1 includes a demultiplexing module, a video decoding module, an image synthesis module, a frame rate conversion module, a display formatting module, etc.

The display 280 is used to receive the image signals input from the video processor 260-1, and display the video content and images as well as the menu control interface. The display 280 includes a display component for presenting images and a drive component that drives the image display. The displayed video content may come from the video in the broadcast signal received by the modem 220, or from the video content input by the communicator or external device interface. The display 280 also displays a user control interface (UI) generated in the display apparatus 200 and used to control the display apparatus 200.

Further, due to the different types of display 280, it further includes a drive component for driving the display. Alternatively, if the display 280 is a projection display, it may further include a projection apparatus and a projection screen.

The audio processor 260-2 is used to receive the audio signal, and perform the audio data processing such as decompression, decoding, noise reduction, digital-to-analog conversion and amplification according to the standard codec protocol of the input signal, to obtain the audio signal that can be played in the speaker 272.

The audio output interface 270 is used to receive the audio signal output from the audio processor 260-2 under the control of controller 210, and the audio output interface may include a speaker 272, or an external audio output terminal 274 output to an external device, such as external audio terminal or headphone output terminal.

In other some embodiments, the video processor 260-1 may include one or more chips. The audio processor 260-2 may also include one or more chips.

And, in other some exemplary embodiments, the video processor 260-1 and the audio processor 260-2 may be individual chips, or may be integrated into one or more chips together with the controller 210.

The power supply is used to provide the power supply support for the display apparatus 200 through the power input from an external power supply under the control of the controller 210. The power supply may include a built-in power supply circuit installed inside the display apparatus 200, or may be a power supply installed outside the display apparatus 200, such as a power interface that provides an external power supply in the display apparatus 200.

It should be noted that the hardware system architecture of the display apparatus 200 shown in FIG. 3 is described by taking the single hardware system architecture as an example, and the embodiments of the disclosure may also be applied to a display apparatus having multiple hardware systems.

Figure 4:
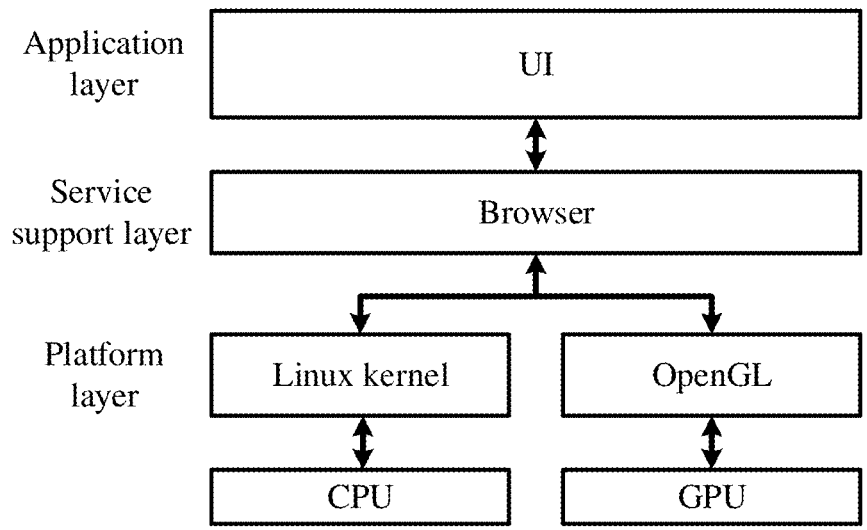
FIG. 4 illustrates a schematic diagram of an operating system architecture of the display apparatus 200 according to some embodiments.

FIG. 4 illustrates a schematic diagram of an operating system architecture of the display apparatus 200 according to some embodiments.

As shown in FIG. 4, Android system is taken as an example. The operating system architecture of the display apparatus 200 includes three layers, which are a platform layer, a service support layer and an application layer respectively. The platform layer mainly includes the Linux kernel and various hardware drivers. The service support layer mainly includes middlewares, which are used to support and maintain the upper-layer services based on the Linux kernel and hardware drivers, provide a browser environment in which the User Interface (UI) runs, start the browser processes after the display apparatus starts up, and render the UI pages through the graphics engine. The UI is located in the application layer, and is responsible for presenting the service functions, and drawing the graphics and implementing functions through the Web technologies supported by the browser.

Figure 5:
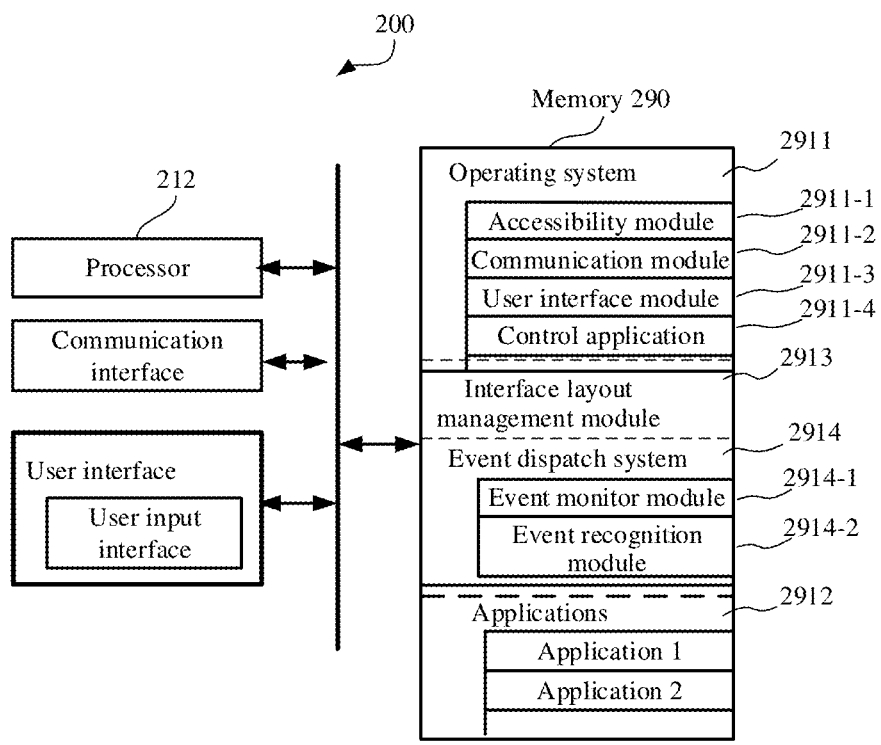
FIG. 5 illustrates a schematic diagram of the functional configuration of the display apparatus according to some embodiments.

FIG. 5 illustrates a schematic diagram of the functional configuration of the display apparatus according to some embodiments.

As shown in FIG. 5, the memory 290 is used to store the operating system, applications, content, user data, and the like, and drive the system of the display apparatus 200 to run and respond to various operations from the user under the control of the controller 210. The memory 290 may include a transitory and/or non-transitory memory.

The memory 290 is used to store the drive programs and related data of the video processor 260-1, the audio processor 260-2, the display 280, the communication interface 230, the modem 220, the input/output interface and the like.

Exemplarily, the memory 290 includes a broadcast receiving module 2901, a channel control module 2902, a volume control module 2903, an image control module 2904, a display control module 2905, an audio control module 2906, an external instruction recognition module 2907 (including a voice recognition module 2907-2 and a key instruction recognition module 2907-3), a communication control module 2908, a light receiving module, a power control module 2910, an operating system 2911, and other applications 2912, a browser module, etc. The controller 210 executes various software programs in the memory 290 to perform various functions such as: broadcast television signal reception and demodulation function, television channel selection function, volume selection function, image control function, display control function, audio control function, external instruction recognition function, communication control function, optical signal receiving function, power control function, software control platform supporting various functions, browser function, etc.

The external instruction recognition module 2907 may recognize different instructions. The external instruction recognition module 2907 may include a voice recognition module 2907-2 storing a voice database therein. When the voice receiving device or the like receives a voice command from the outside, which corresponds to the command in the voice database, to perform control on the display apparatus. Similarly, the control device 100 such as remote is connected to the chip in the display apparatus 200, and a key instruction recognition module in the display apparatus 200 performs the instruction interactions with the control device 100.

Figure 6:
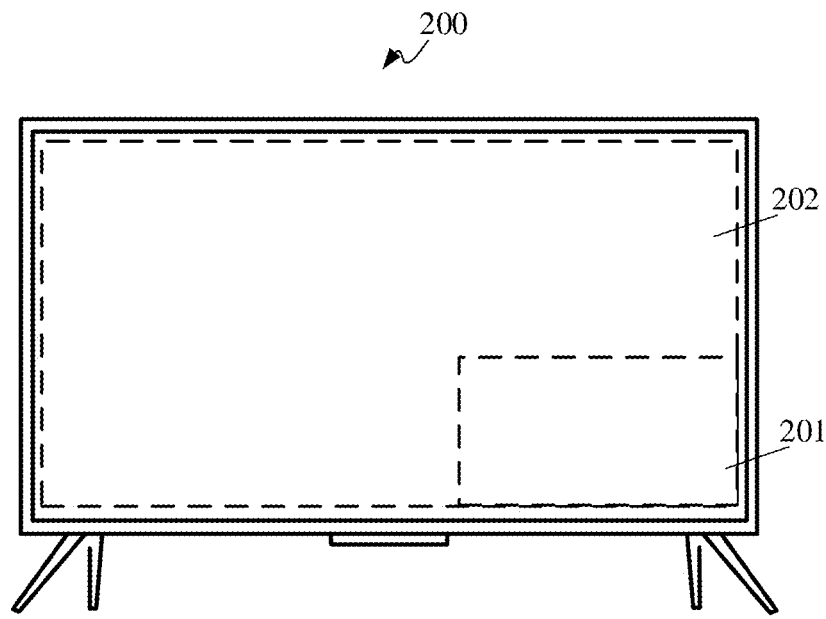
FIG. 6 illustrates a schematic diagram of a user interface in the display apparatus 200 according to some embodiments.

FIG. 6 illustrates a schematic diagram of the user interface in the display apparatus 200 according to some embodiments. As shown in FIG. 6, the user interface includes multiple view display areas, for example, a first view display area 201 and an image 202, wherein the image includes one or more different items. And the user interface further includes a selector for indicating that an item is selected, and the position of the selector can be moved by a user input to select a different item.

It should be noted that multiple view display areas may present images with different display priorities. For example, the first view display area may present a thumbnail of a media object, and the second view display area may present a media object (e.g., an image, a video, etc.).

In some embodiments of the disclosure, there are priority differences in the presentation of different view display areas. The display priorities of the view display areas are different for the view display areas with different priorities. For example, the priority of the system layer is higher than the priority of the application layer. When a user uses a selector and image switching in the application layer, the image display of the view display area in the system layer is not blocked. When the size and position of the view display area in the application layer are changed according to a user's selection, the size and position of the view display area in the system layer are not affected.

Images with same priorities may also be presented. In this case, the selector may switch between the first view display area and the second view display area, and when the size and position of the first view display area are changed, the size and position of the second view display area may be changed accordingly.

In an example where an image is a media object, in the embodiments of the disclosure, an image is displayed on the display screen of the display apparatus. After the user sends an command for performing a display setting on this image through a control device such as a remote controller or through other user input manners (such as voice or gesture), as a response, the display apparatus performs a corresponding setting on this image according to this command and then displays it. Since the size of an enlarged image exceeds the size of the image display area in the display screen, only a portion of image can be displayed in the display screen. In this case, a thumbnail show window can be used. The thumbnail show window has the relatively small size and can present the whole image and a portion of the image in the image display area of the display screen in a thumbnail form to the user, so that the user can clearly see which portion of the image is currently displayed on the display screen.

Here, the command for setting the display of the image may be an instruction for enlarging and displaying the image, or an instruction for moving the enlarged image, or an instruction for rotating the enlarged image, which is not limited in the embodiments of the disclosure.

In an example where an image is a media object, in some embodiments, a user may use a menu for performing a setting on the image through a remote controller, and based on the image display setting function provided by the menu, perform a display control such as enlargement on the image.

It should be noted that the user input for triggering the enlargement and display of the media object (such as an image) may be an instruction sent from a user through a remote controller, or an instruction sent via other methods, such as voice control, which is not limited in the embodiments of the disclosure.

Figure 7A:
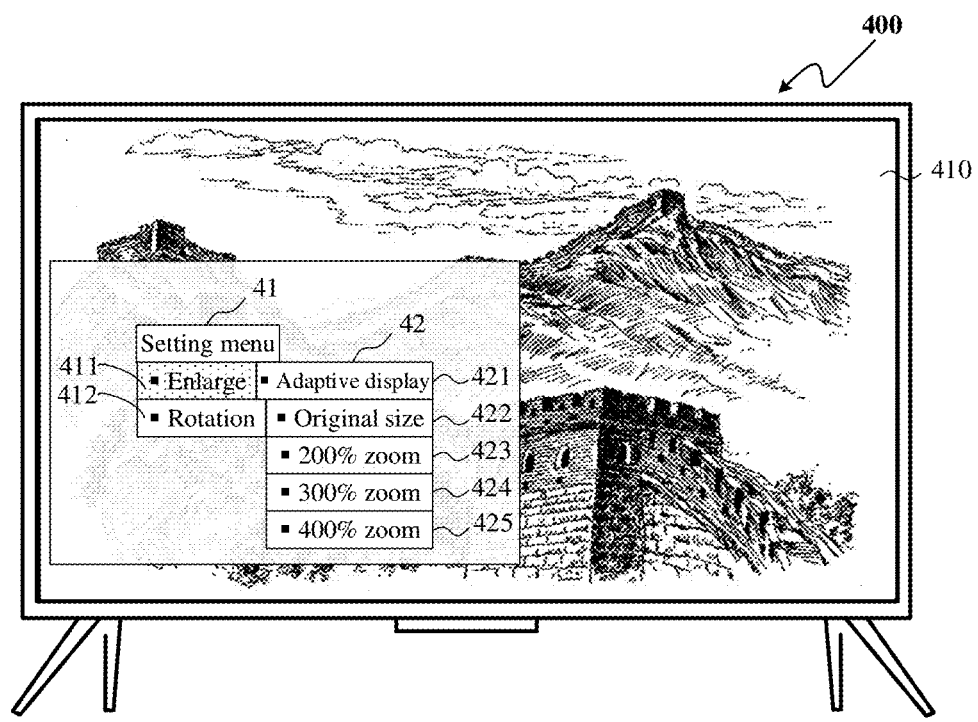
FIG. 7A illustrates a schematic diagram of a menu for image display settings according to some embodiments.

FIG. 7A illustrates a schematic diagram of a menu for performing display settings on an image.

There is an image 410 in the image display area 400 of the display screen in the current display apparatus. In some embodiments, the image display area is the entire screen area of the display apparatus. In some embodiments, the image display area is smaller than the entire screen area. For example, when a user is able to use different aspect ratios for display, the width of the image display area may be narrower than the width of the entire screen display area according to the aspect ratio selected by the user. In this embodiment, an example where the size of the image display area is almost equal to the screen display area of the display apparatus is described.

The menu 41 presents on the display screen after the user presses the "menu" key on the remote controller.

The menu 41 includes the following function options:

"enlarge" 411, configured for enlarging an image to display;

"rotate" 412, configured for rotating an image to display.

In some embodiments of the disclosure, in addition to the above function options, other function options may be further included, for example, a function option used to realize a slideshow display effect may be included.

In some embodiments, in response to a user's selection for the option of "enlarge 411" through a remote controller, a secondary menu 42 of this function option pops up, where the secondary menu 42 includes the following function options:

"adaptive display" 421, configured for displaying the image with a size almost as the size of the display area of the screen; for example, the entire image may be displayed in the display area after the user selects this function option;

"original size" 422, configured for displaying the image in the actual resolution;

"200% zoom" 423, configured for enlarging the image twice for display;

"300% zoom" 424, configured for enlarging the image three times for display;

"400% zoom" 425, configured for enlarging the image four times for display.

In some embodiments, in response to a user's selection for the option of "rotate 412" through a remote controller, a secondary menu (not shown in the figure) of this function option pops up, where the secondary menu includes the following function options:

"rotate 90 degrees clockwise", configured for rotating the image 90 degrees clockwise for display;

"rotate 90 degrees anticlockwise", configured for rotating the image 90 degrees anticlockwise for display.

It should be noted that the number of function options in the above menu, the functions, and so on are only examples, and the actual applications may not be limited by the function options listed above.

It should also be noted that sending a command for performing a display setting on the image to the display apparatus through a menu is only an example. In some embodiments, it is also possible to send a command for performing a display setting on the image in the display screen to the display apparatus in other ways. For example, in some embodiments, a user may send a command to the display apparatus through a corresponding gesture, and in other embodiments, a user may input a speech, and the display apparatus may obtain an instruction through speech recognition, which is not limited in the embodiments.

In some embodiments, in response to a user's selection for the option of "200% zoom" 423 through the remote, a current display frame of the image is obtained, and a first portion of the current display frame of the image is presented on a refreshed user interface. The refreshed user interface further includes a thumbnail show window, where the thumbnail show window is presented floating over the first portion of the current display frame and used to present a thumbnail of the current display frame of the image. A first area of the thumbnail is marked, and the first area in the thumbnail is associated with the first portion of the current display frame of the image.

Figure 7B:
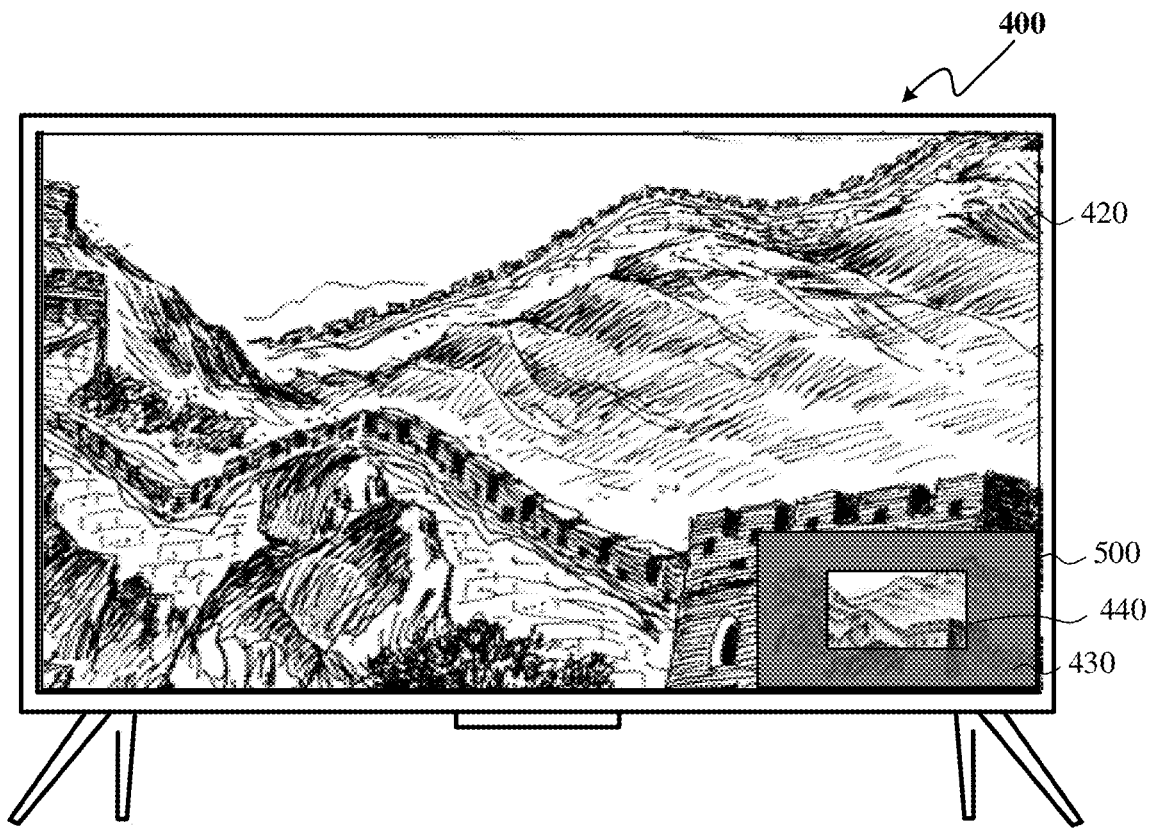
FIG. 7B illustrates a schematic diagram of the user interface after performing an enlargement operation on an image according to some embodiments.

Specifically, the display screen of the display apparatus may be as shown in FIG. 7B.

As shown in FIG. 7B, in response to a user's selection for the option of "200% zoom" 423, the image 410 is enlarged. Since the size of the enlarged image exceeds the size of image display area 400, a partial image 420 (i.e., first portion) of the enlarged image is displayed in the image display area 400, and the thumbnail show window 500 is displayed in the display screen.

In some embodiments of the disclosure, the thumbnail show window may cover a part of the image display area. For example, as shown in FIG. 7B, the thumbnail show window 500 overlaps with the image display area 400 and is located in the lower right corner of the image display area. In other embodiments, the size of the image display area is smaller than the size of the display area of the display screen, thus the display area of the display screen may include the image display area and an area for displaying other information. In this case, the thumbnail show window may be located in the area for displaying other information, that is, not overlap with the image display area.

In some embodiments of the disclosure, the size of the thumbnail show window is relatively small, so that the effect of the thumbnail show window on the image displayed in the image display area can be reduced when the thumbnail show window overlaps with the image display area.

As shown in FIG. 7B, the thumbnail 430 of the image 410 is displayed in the thumbnail show window 500, where the partial area 440 (i.e., first area) of the thumbnail is identified. The position of the partial area 440 (first area) in the thumbnail is associated with the position of the first portion 420 (partial image) of the image. Specifically, the size and position of the partial area 440 relative to the thumbnail 430 correspond to the size and position of the displayed portion 420 in the whole enlarged image 410, where the thumbnail 430 may be obtained by scaling down the image 410 in proportions.

Figure 8A:
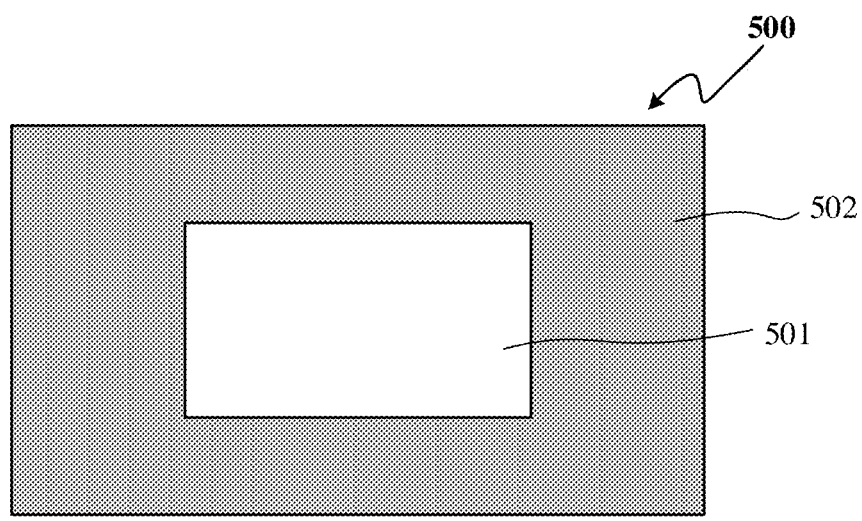
FIG. 8A illustrates a schematic diagram of two regions in a thumbnail show window according to some embodiments.

The thumbnail show window 500 includes two areas: a display area 501 and a blocked area 502, as shown in FIG. 8A. The display area 501 is used to display the partial area 440, and the blocked area 502 displays background color or background image. The background color or background image may be set to be opaque or semi-transparent. If the background color is set to be semi-transparent, the blocked area 502 displays with an effect of combining the remaining image in the thumbnail 430 of the image 410 except the display area 501 with the semi-transparent background color.

Figure 8B:
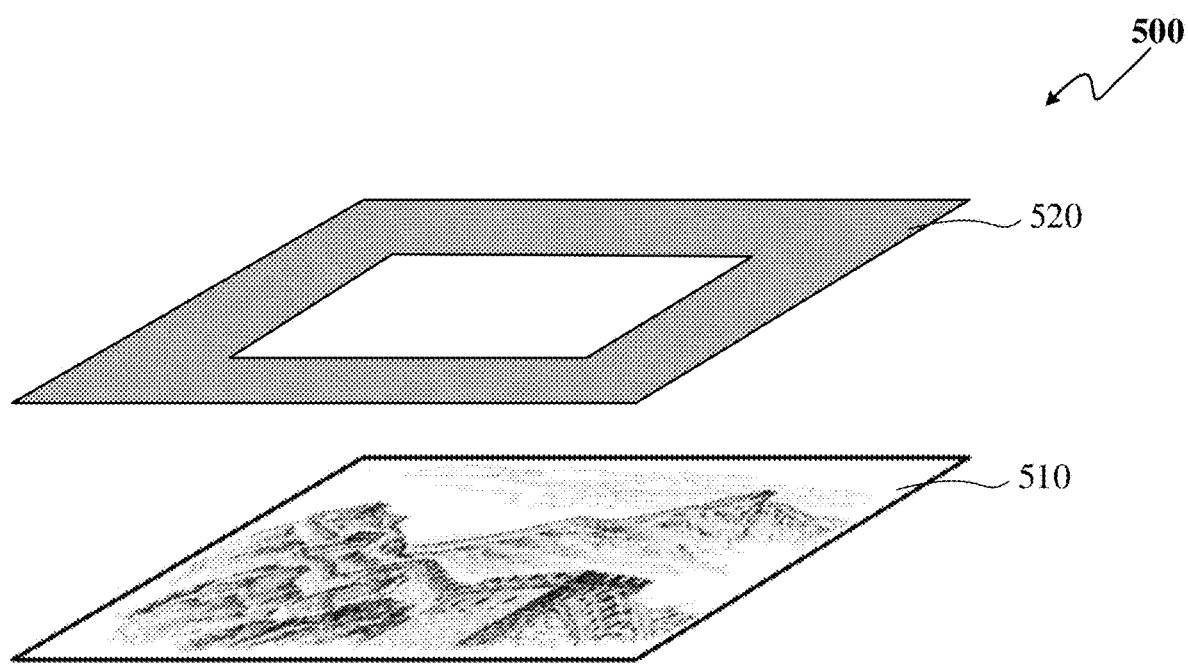
FIG. 8B illustrates a schematic diagram of two layers of the thumbnail show window according to some embodiments.

In order to achieve the display effect of the thumbnail show window 500, in an embodiment of the disclosure, as shown in FIG. 8B, the thumbnail show window 500 includes a first layer 510 and a second layer 520. The presentation effect of the thumbnail show window 500 can be presented by the overlay effect of the first layer 510 and the second layer 520. The first layer 510 displays the thumbnail 430, and the second layer 520 is a partially hollow layer, which partially covers the first layer 510. The open area of the second layer 520 corresponds to the display area 501 in the thumbnail show window and is used to display the partial area 440. The area of the second layer 520, covering the first layer 510, corresponds to the blocked area in the thumbnail show window and is used to display the background color or background image.

In some embodiments of the disclosure, the background may be the semi-transparent background, so as to achieve the display effect as shown in FIG. 8A. In other embodiments, the background may also be opaque background.

In some embodiments of the disclosure, the first layer 510 in the thumbnail show window 500 may be implemented by the <div> tag in the HTML tag language. In some embodiments, the background-image attribute of the CSS may be used in this tag to display the background image. In some embodiments, the display of the thumbnail 430 in the thumbnail show window is implemented through closed <div></div> tag, and the CSS attributes in the style are used to set the width, height, and URL address of the thumbnail. In the display apparatus, after a running browser reads this tag, this tag can be parsed in the UI layer, and the user interface is rendered, so that the image thumbnail is displayed on the first layer 510 in the thumbnail show window 500.

In some embodiments of the disclosure, the thumbnail needs to be obtained by the underlying player, and the implementation method is as follows: the underlying player encapsulates a JavaScript extension interface configured for communication between the player and the UI layer of the display apparatus through a message distribution module of the browser, and to implement message delivery between the UI layer and the underlying player in a manner which allows the UI layer easy to use and conforms to the browser Web technology specifications, including a UI layer, browser communication layer, player middleware and underlying player.

Figure 9:
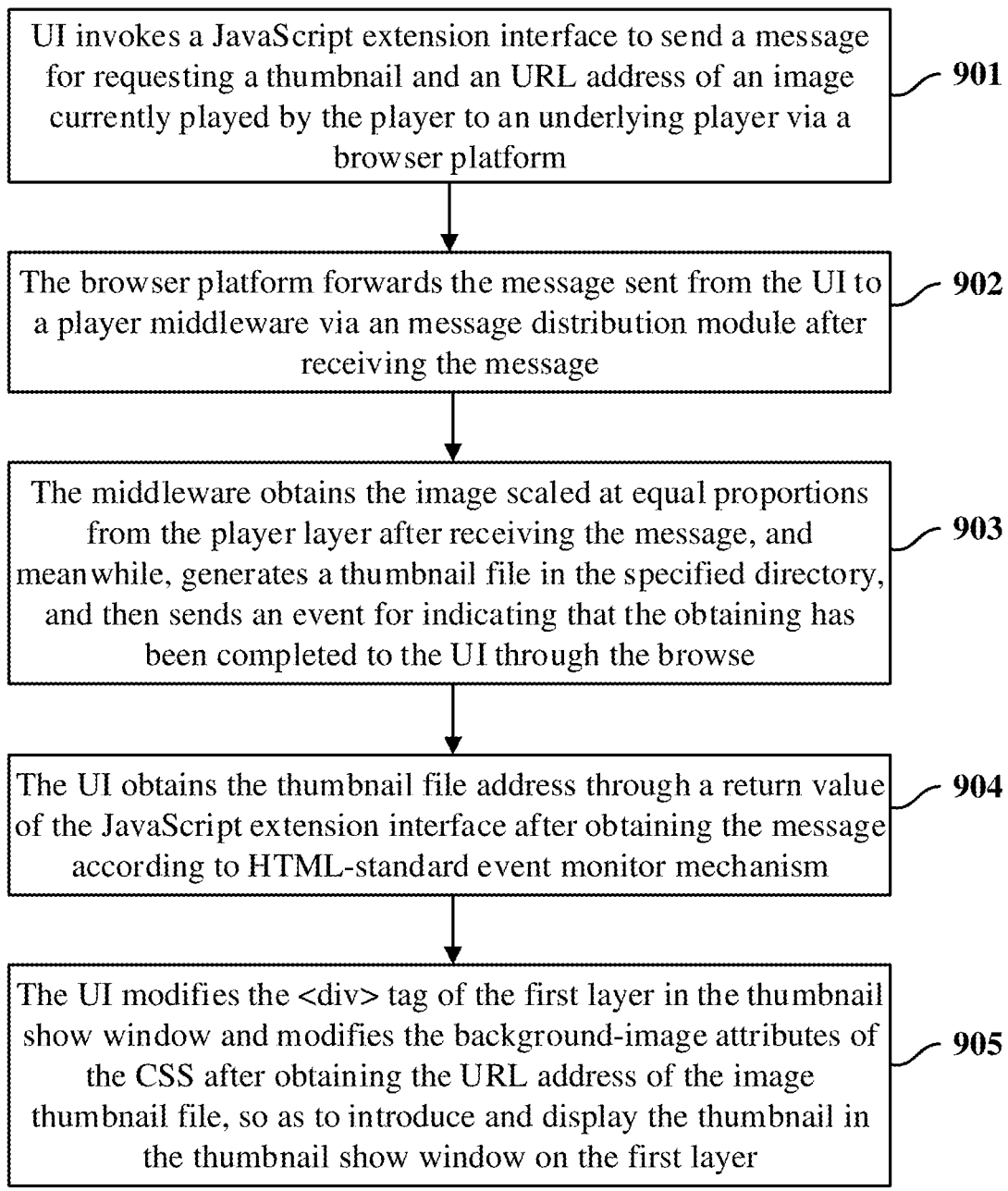
FIG. 9 illustrates a process of obtaining a thumbnail according to some embodiments of the disclosure.

FIG. 9 illustrates a process of obtaining a thumbnail according to some embodiments of the disclosure. As shown in FIG. 9, the process may include:

step 901: UI invokes a JavaScript extension interface to send a message for requesting a thumbnail and an URL address of an image currently played by the player to an underlying player via a browser platform;

step 902: the browser platform forwards the message sent from the UI to a player middleware via an message distribution module after receiving the message;

step 903: the middleware obtains the image scaled at equal proportions from the player layer after receiving the message, and meanwhile, generates a thumbnail file in the specified directory, and then sends an event for indicating that the obtaining has been completed to the UI through the browser;

step 904: the UI obtains the thumbnail file address through a return value of the JavaScript extension interface after obtaining the message according to HTML-standard event monitor mechanism; and 905: the UI modifies the <div> tag of the first layer in the thumbnail show window and modifies the background-image attributes of the CSS after obtaining the URL address of the image thumbnail file, so as to introduce and display the thumbnail in the thumbnail show window on the first layer.

In some embodiments of the disclosure, in order to obtain a better display effect for better user experience, the size of the thumbnail (or the size of the thumbnail frame) in the thumbnail show window 500 may be configured to have the aspect ratio of 16:9 according to the size of the display screen of the display apparatus. Since the resolutions of different images may be different, the resolutions of the thumbnails obtained after reducing the images with different resolutions in equal proportions are also different. Thus, the width and height of the thumbnail need to be set according to the resolution of the thumbnail, to adapt to the size of the thumbnail frame in the thumbnail show window. The specific calculation method is directed to compare the image resolution with 16:9, and the calculation method is as follows.

Firstly, an image is scaled down in equal proportions to obtain a thumbnail of the image.

The method for calculating a thumbnail width is as follows: if the aspect ratio of a thumbnail is less than 16:9, the width of the thumbnail is adjusted to be equal to the product of the height of the thumbnail frame and the image resolution; and if the aspect ratio of the thumbnail is greater than or equal to 16:9, the width of the thumbnail is adjusted to be equal to the width of the thumbnail frame.

The method for calculating a thumbnail height is as follows: if the aspect ratio of a thumbnail is greater than 16:9, the height of the thumbnail is adjusted to be equal to a result value which is obtained by dividing the width of the thumbnail frame by the image resolution; and if the aspect ratio of the thumbnail is less than or equal to 16:9, the height of the thumbnail is adjusted to be equal to the height of the thumbnail frame.

After the width and height of the thumbnail are adjusted, the two adjusted values are passed as parameters to the <div> tag of the first layer 510 in the thumbnail show window, and the width attribute value and height attribute value of the CSS in this tag are modified. The browser detects that the attribute values in this tag have changed, and then re-renders the graphic according to the attribute values in the updated tag, to achieve the purpose of dynamically adjusting the width and height of the image thumbnail according to different image resolutions to match the size of the thumbnail frame.

In some embodiments of the disclosure, the second layer 520 in the thumbnail show window may be implemented by the <div> tag in the HTML tag language, which may be independent of the HTML <div> tag for implementing the first layer 510. In this tag, the values may be assigned to the width, height, and position of the display area in the rem way, so that the width and height of the display area are the relative values with respect to the width and height of the thumbnail frame, and the positions of the top and left borders of the display area are the relative values with respect to the positions of the top and left frames of the thumbnail frame. When a user performs a display setting operation (such as enlarging or moving or rotating or other operation) on the image, at least one of the attribute values of the width, height and position of the display area in the tag is modified according to the user's display setting operation on the image. The browser detects that the attribute values in this tag have changed, and then re-renders the graphic according to the attribute values in the updated tag, to achieve the purpose of displaying the position and size of the partial image displayed in the current image display area with respect to the entire image of the image through the thumbnail show window in real time according to the user's display setting operation.

Here, the width of the display area refers to the width value in the x-axis (horizontal axis) direction, the height refers to the height value in the y-axis (vertical axis) direction, and the position may be expressed by the horizontal and vertical coordinates (x, y).

Figure 10:
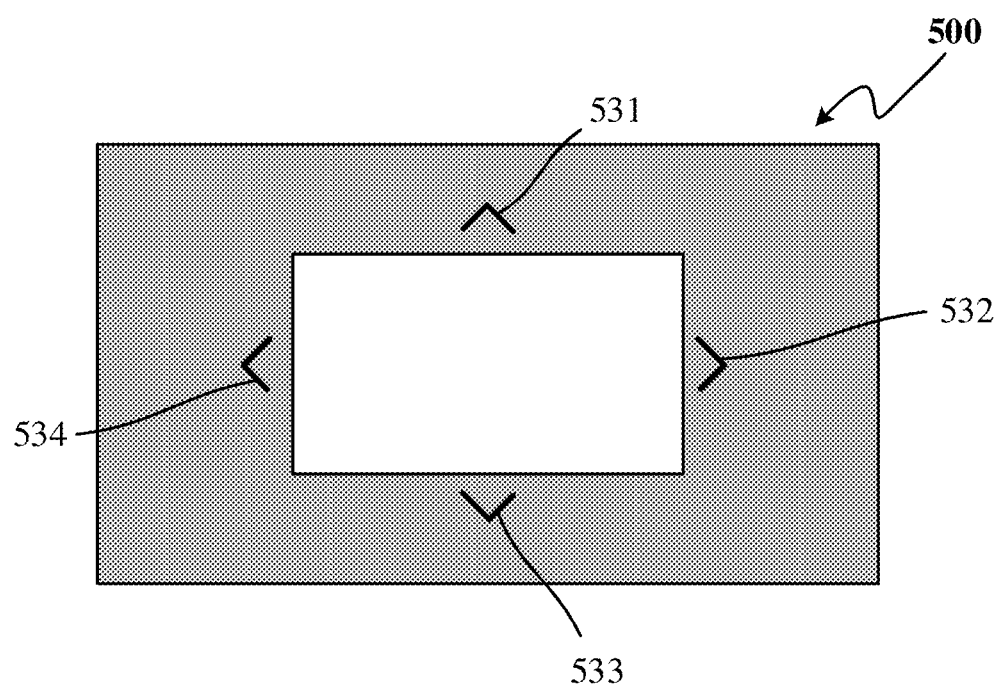
FIG. 10 illustrates a schematic diagram of moving direction indicators for thumbnail show window according to some embodiments.

In some embodiments of the disclosure, the direction indicators (531-534) may also be displayed in the thumbnail show window 500, as shown in FIG. 10. The direction indicators (531-534) are used to indicate the movable directions of the image. The direction indicators (531-534) may be in the form of arrow as shown in FIG. 10, or may be in other forms, which is not limited in the embodiments of the disclosure. The transparency of the direction indicators may be set to 0 (that is, the direction indicators are opaque), and the direction indicators may be overlaid on the first layer 510, for example, displayed in the second layer 520.

In some embodiments of the disclosure, when the partial image moves to an edge of the image or a position close to an edge according to a user's operation of moving the image, the direction indicator at the edge position may not be displayed. For example, a user moves the display area of the image to the right through a direction key on the remote controller until it can no longer be moved. In this case, the right border of the display area in the thumbnail show window overlaps with the right border of the thumbnail, and the direction indicator on this side disappears.

In some embodiments of this disclosure, the CSS border attribute in the <div> tag in the HTML tag language may be used to achieve the border effect of the display area.

In some embodiments of this disclosure, the <div> tag in the HTML tag language may be used to implement the presentation of the direction indicators. Specifically, the direction indicators are implemented by using four independent <div> tags, which are used to package the tag <div></ div> of the display area therein, thereby forming a child element of the display area. As such, the CSS attributes configured by these four tags may be based on the position of the parent element, so as to realize the display effect that the positions of the direction indicators move with the movement of the display area or are adjusted with the width and height changes of the display area.

According one or more embodiments described above, FIG. 11 illustrates a process of enlarging and displaying an image. When a user uses a remote controller to invoke a menu for controlling image display, the user selects a zoom factor through an enlarge option in the menu. After the user presses the "confirm" key on the remote, the display apparatus responds upon receiving an instruction corresponding to the key on the remote controller, where the response process may, as shown in the figure, include the following steps 1101-1104.

Step 1101: upon receiving an instruction from an key on a remote controller, UI of the display apparatus determines whether a monitor event corresponding to the instruction associated with the key and a value of the key have been registered; in response to the monitor event and the value having been registered, the flow goes to the subsequent steps; in response to the monitor event and the value having not been registered, the instruction corresponding to the key is ignored.

Step 1102: the UI of the display apparatus calculates a size of an image after enlargement according to the zoom factor, and invokes a service support layer to refresh the image display area to display the image after enlargement (i.e., an enlarged image).

Step 1103: the UI of the display apparatus calculates the width and height of the display area in the thumbnail show window.

In this step, the computed attribute of the Vue component detects a change in the zoom factor of the image, and then triggers the calculations of the width and height of the display area in the second layer of the thumbnail show window.

This function is implemented by using the Vue component, which is a part of the UI page, like a certain element (mouse, keyboard, etc.) in the computer, and is integrated and encapsulated into an independent logic and functional interface through some conventional rules. In some embodiments, the Vue framework provides many API functions for implementing different functions. When used, it may be extended on the basis of the HTML tags, and introduce the CSS files to achieve the style control and the JavaScript files to achieve the functional interaction logic. In some embodiments, the HTML tags and JavaScript control logics of two layers of the thumbnail show window may be encapsulated into a Vue component, and the v-if function provided by the Vue framework may control whether this function component is rendered in the browser page. When a user presses a remote controller to set the zoom factor, the display apparatus UI will set the v-if value in this component to be "true", and the browser will start rendering this component and invoke the function of the thumbnail show window.

After calculating the new width, height and arrow coordinates, the Vue component will re-assign the values to the CSS attributes for describing the display area in the <div> tag of the second layer for the thumbnail show window, and then the browser re-renders the UI page of the display apparatus according to updated tag.

In some embodiments, when zoom factor is changed by setting, the zoom factor is passed as a parameter into the Vue component. The Vue component may uses the computed attribute that is an integrated function of the Vue framework to detect the value change and performs a corresponding operation. After a function of zoom factor changes, it triggers the recalculations of the width and height of the display area for the thumbnail show window as well as the position coordinates of the four direction indicators, because the player accomplishes the image enlargement by multiplying the width and height of the image with the zoom factor and taking a square root of the product, that is, the area magnification corresponds to the factor. Therefore, the width and height of the display area of the thumbnail show window are calculated as:

width of the display area=width of thumbnail frame/$\sqrt{}$zoom factor height of the display area=height of thumbnail frame/$\sqrt{}$zoom factor Taking an arrow being the direction indicator as an example, the coordinates of four arrows around the display area are calculated as:

top arrow: abscissa $x$=(width of the display area−arrow width)/2;

ordinate $y$=arrow height;

bottom arrow: abscissa $x$=(width of the display area−arrow width)/2;

ordinate $y$=height of the display area;

left arrow: abscissa $x$=−arrow width;

ordinate $y$=(height of the display area−arrow height)/2;

right arrow: abscissa $x$=width of the display area;

ordinate $y$=(height of the display area−arrow height)/2.

Step 1104: UI of the display apparatus invokes a browser from the service support layer to refresh the second layer in the thumbnail show window according to the calculated width and height of the display area in the thumbnail show window.

In this step, the UI modifies the CSS attribute values in the <dir> tag in the HTML tag language corresponding to the second layer according to the calculation result. After the browser is invoked, the browser parses the updated HTML tag language of the second layer, and renders the second layer of the thumbnail show window.

Figure 11:
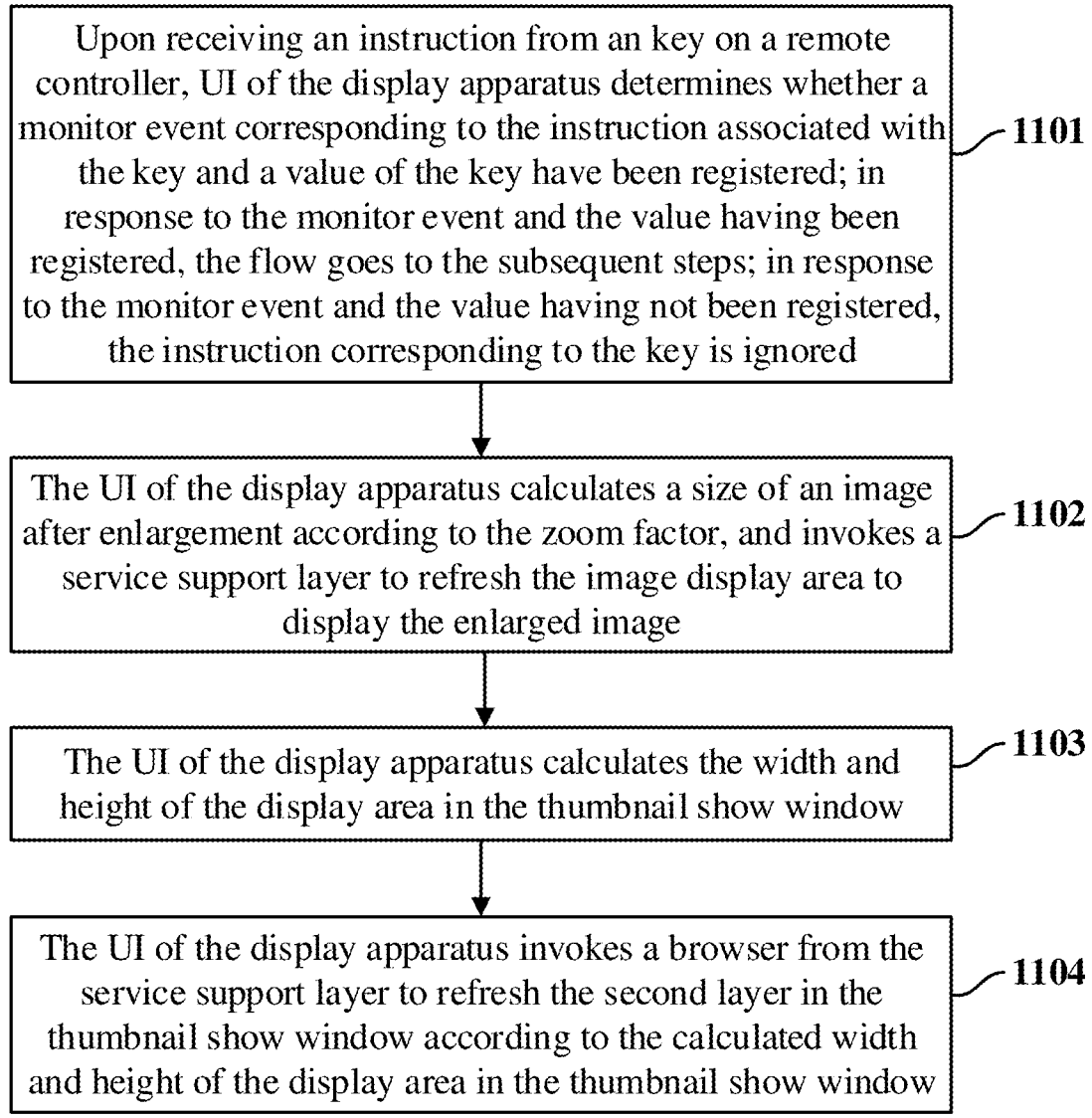
FIG. 11 and FIG. 12 illustrate schematic diagrams of a process of enlarging and displaying an image according to some embodiments.

In some embodiments of the disclosure, in the above process shown in FIG. 11, if the display apparatus does not display the thumbnail show window on the display screen before receiving an instruction from a key on the remote controller, the thumbnail show window needs to be displayed on the UI after the instruction for image enlargement.

Figure 12:
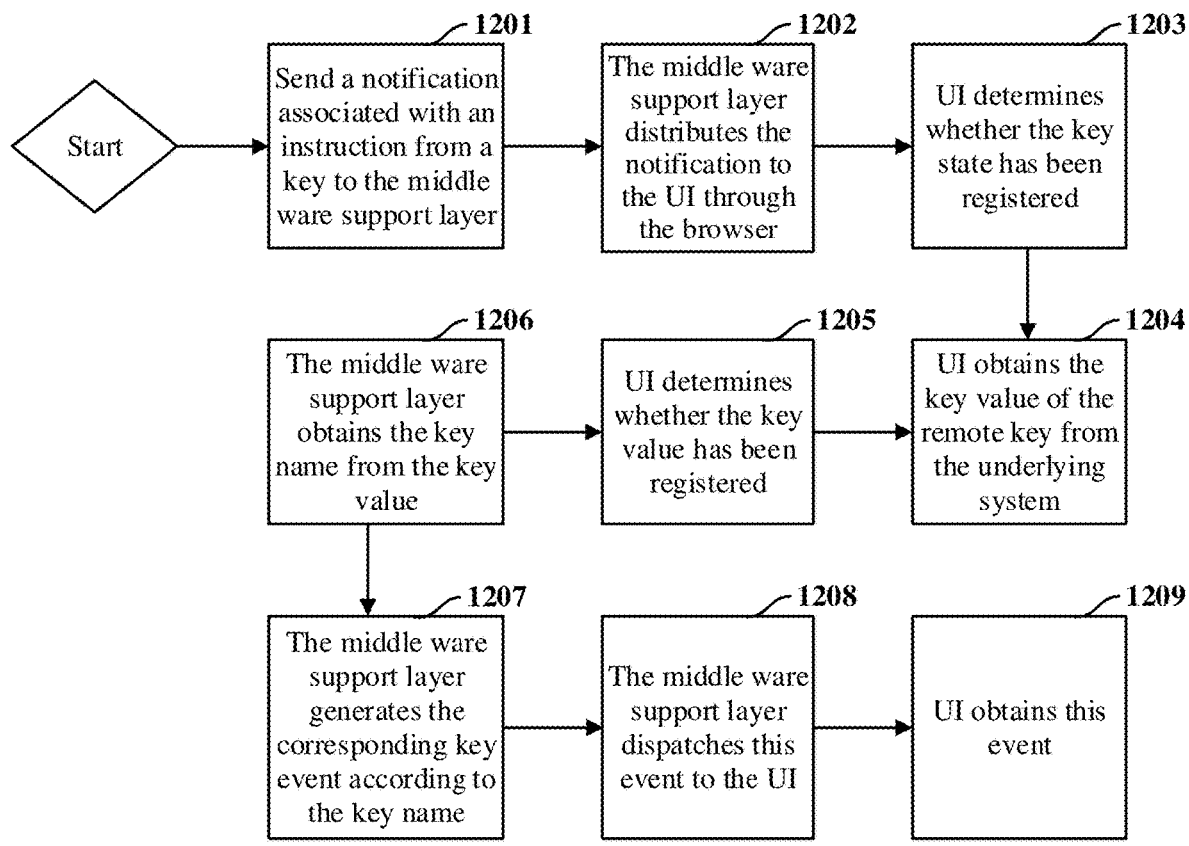

In some embodiments of the disclosure, in the above process shown in FIG. 11, the process of the step 1101 may, as shown in FIG. 12, include the following steps 1201-1209.

Step 1201: underlying driver of the display apparatus system receives an instruction from a key on the remote controller and sends a notification to the middle ware support layer.

Step 1202: after receiving the notification, the middle ware support layer distributes the notification to the UI through the browser.

Step 1203: after receiving the notification from the remote key, the UI for displaying the image determines whether the key state has been registered in the UI, i.e., whether it is a "the key is pressed" event.

In this embodiment, once the UI is launched, it will register monitor events and key values of the remote controller. In this example, the registered value is the key value of the "confirm" key, and the registered monitor event is the event that the key is pressed.

Steps 1204-1205: if the key state has been registered, the UI obtains the key value of the remote key from the underlying system, and determines whether this key value has been registered.

Steps 1206-1209: if this value has been registered, the middle ware support layer obtains the key name, generates a corresponding key event, and dispatches this event to the UI so that the UI responds to the key event.

The above process utilizes the message dispatch mechanism (event bus) of the display apparatus system architecture to send notifications corresponding to the remote keys through a general message control, so that the UI application performs a corresponding logic processing after receiving the notifications corresponding to the remote keys.

In other embodiments, in the thumbnail show window, the method for identifying the partial area 440 of the thumbnail may also be: identifying the position and size of the partial area 440 of the thumbnail in the image thumbnail 430 by using a solid frame or a dotted frame.

In some embodiments of the disclosure, after the image is enlarged and displayed, the user may also be allowed to move the image to view other areas of the image. Correspondingly, the display area in the thumbnail show window is also moved and shown accordingly.

In some embodiments, taking a first part of the image being displayed on the display screen of the display apparatus, and a first area of the thumbnail is displayed in the thumbnail show window as an example. After a user sends a move instruction via a direction key of the remote (or sends a move instruction via the user input in other ways), a second part of the image is presented in the refreshed user interface in response to a user input, here the second part being the target image after movement. The position of the second part on the image is shifted from the position of the first part on the image along a direction of the movement. In the thumbnail show window on the refreshed user interface, a second area of the thumbnail is marked, and the position of the second area in the thumbnail is associated with the position of the second part of the image, so that the size and position of the second partial area relative to the thumbnail correspond to the size and position of the second partial image relative to the entire image of the image after the image is moved.

As an example, a user presses a right direction key on the remote. In response to an instruction corresponding to the right direction key, the display apparatus, on the one hand, moves the image to the left so that the part displayed in the image display area is the one after moving to the right by the first step, and on the other hand, moves the partial image of the thumbnail displayed in the display area in the thumbnail show window to the right by the second set step.

In the player, the image movement is implemented mainly through JavaScript extension interface. After a user sends an instruction for moving the image to the display apparatus through a direction key on the remote or in other ways (such as a gesture), the UI invokes the JavaScript extension interface to send a move command to the player after receiving this instruction. The player controls the movement of the player layer according to the first step after receiving the move command, so that the image area displayed in the image display area in the UI is moved accordingly, where the size of the first step may be set by system, for example, may be 20 pixels.

When an image is moved, it is moved by the first step each time, and the partial area of the thumbnail displayed in the display area in the thumbnail show window may also be moved by the corresponding second step in the same direction. The calculation method of the second step is:

$$\text{second step} = \text{first step} \times (\text{width of image thumbnail frame}/\text{width of display area of display screen})/\sqrt{\text{zoom factor}}$$

After the second step is calculated, the position of the display area in the thumbnail show window may be calculated according to the second step, such as the top attribute value and the left attribute value of the CSS used to control the position of the display area in the HTML tag. As an example, a user presses a right direction key on the remote controller, then the top attribute value of the CSS configured to control the position of the display area remains unchanged, and the left attribute value increases by the second step. In some embodiments, the top attribute value and left attribute value of the CSS in the tag of the display area in the thumbnail show window may be re-calculated by invoking a move function in the Vue component. After a move operation, the browser re-renders the thumbnail show window according to the updated HTML tag.

In some embodiments of the disclosure, it is noted that how to process when the image moves to a boundary. The player stops moving after an image moves to the boundary, so the image size may be used as the boundary, for calculating the boundary values for the display area in the thumbnail show window. In some embodiments, the actual width and height of the image thumbnail may be used as the boundary condition. The upper boundary value is the height of the image thumbnail minus the height of the display area, and the lower boundary value is greater than 0. The right boundary value is less than the result of the thumbnail width minus the width of the display area, and the left boundary value is greater than 0.

In some embodiments of the disclosure, since the direction indicator may be used to indicate move direction around the display area in the thumbnail show window, there is also a need to consider the processing on the direction indicator when the image moves to a boundary. If a distance between a certain boundary of the display area in the thumbnail show window and the thumbnail frame is less than the minimum distance for displaying a direction indicator, the direction indicator at this boundary is no longer displayed.

In some embodiments of the disclosure, after the image is enlarged, the user can perform image rotation operation. Accordingly, the thumbnail in the thumbnail show window is also rotated and shown correspondingly.

In some embodiments, as an example, a first partial image of the image is displayed on the display screen of the display apparatus, and a first partial area of the thumbnail is displayed in the thumbnail show window. After a user sends a rotation instruction via a move key on the remote controller (or sends this instruction via the user input in other ways), a third partial image of the image is presented in the refreshed user interface in response to a user input for rotating and displaying the image. Here the third partial image is the target image after the rotation, and the position of the third partial image is shifted from the position of the first partial image before the rotation in the direction of the rotation display. In the thumbnail show window on the refreshed user interface, the third partial area of the thumbnail is marked, and the position of the third partial area of the thumbnail in the thumbnail show window is associated with the position of the third partial image on the image. As such, the size and position of the third partial area relative to the thumbnail correspond to the size and position of the third partial image relative to the entire image of the image after the image is rotated.

As an example, a user presses a key on the remote controller for rotating 90 degrees clockwise, and in response to an instruction corresponding to the key, the display apparatus, on the one hand, rotates the image clockwise by 90 degrees by taking the center as the origin and refreshes the image display area so that this area shows the partial image of a rotated image, and on the other hand, rotates the thumbnail in the thumbnail show window accordingly.

In the player, the image rotation is implemented mainly through JavaScript extension interface. After a user sends an instruction for rotating the image to the display apparatus from a remote controller, the UI invokes the JavaScript extension interface to send a rotation command to the player after receiving this instruction; and the player controls the rotation of the player layer after receiving the rotation command, so that the image area displayed in the image display area in the UI is rotated accordingly.

In the thumbnail show window, the rotation of the thumbnail is controlled by the CSS transform attribute in the HTML tag of this window. Rotating the image clockwise by 90 degrees is taken as an example of a user's selection. The UI records a current rotation angle according to a user's selection to rotate the image to the right, and passes the rotation angle value as a parameter to the Vue component. In the Vue component, the computed attribute automatically monitors a change in rotation angle, and modifies the CSS transform attribute value in the HTML tag of the first layer in the thumbnail show window and re-renders, to thereby display the rotated image thumbnail.

In some embodiments of the disclosure, a corresponding rotation is performed on the thumbnail, and the boundary condition and the corresponding position calculation are triggered again. Since the width of the thumbnail is larger than the height of the thumbnail frame, the width of the image thumbnail will exceed the height of the thumbnail frame after the image is rotated, so the rotated thumbnail needs to be compressed and displayed according to the size of the thumbnail frame. That is, the width and height of the rotated thumbnail need to be re-calculated, so that the width of the thumbnail adapts to the height of the thumbnail frame, and the width and height of the thumbnail display area are adjusted accordingly.

The calculations for the width and height of the rotated thumbnail may be triggered by monitoring the computed attribute in the Vue component, and then the browser re-renders the thumbnail show window according to the calculated parameters. The specific methods for calculating the width and height of the rotated thumbnail are as follows.

The method for calculating the width of the rotated thumbnail is as follows: if the aspect ratio of the image thumbnail before the rotation is less than or equal to 16:9, the width of the rotated thumbnail is the height of the thumbnail frame; and if the aspect ratio of the image thumbnail before the rotation is greater than or equal to 16:9, the width of the rotated image thumbnail is the width of the thumbnail frame/image resolution.

The method for calculating the height of the rotated thumbnail is as follows: if the aspect ratio of the image thumbnail before the rotation is less than 16:9, the height of the rotated image thumbnail is a product of multiplying the height of the thumbnail frame with the image resolution; and if the aspect ratio of the image thumbnail before the rotation is less than or equal to 16:9, the height of the rotated image thumbnail is the width of the thumbnail frame.

In some embodiments of the disclosure, since the width and height of the rotated thumbnail are adjusted, the width and height of the display area in the thumbnail show window may also be adjusted according to the same compression ratio.

Figure 13:
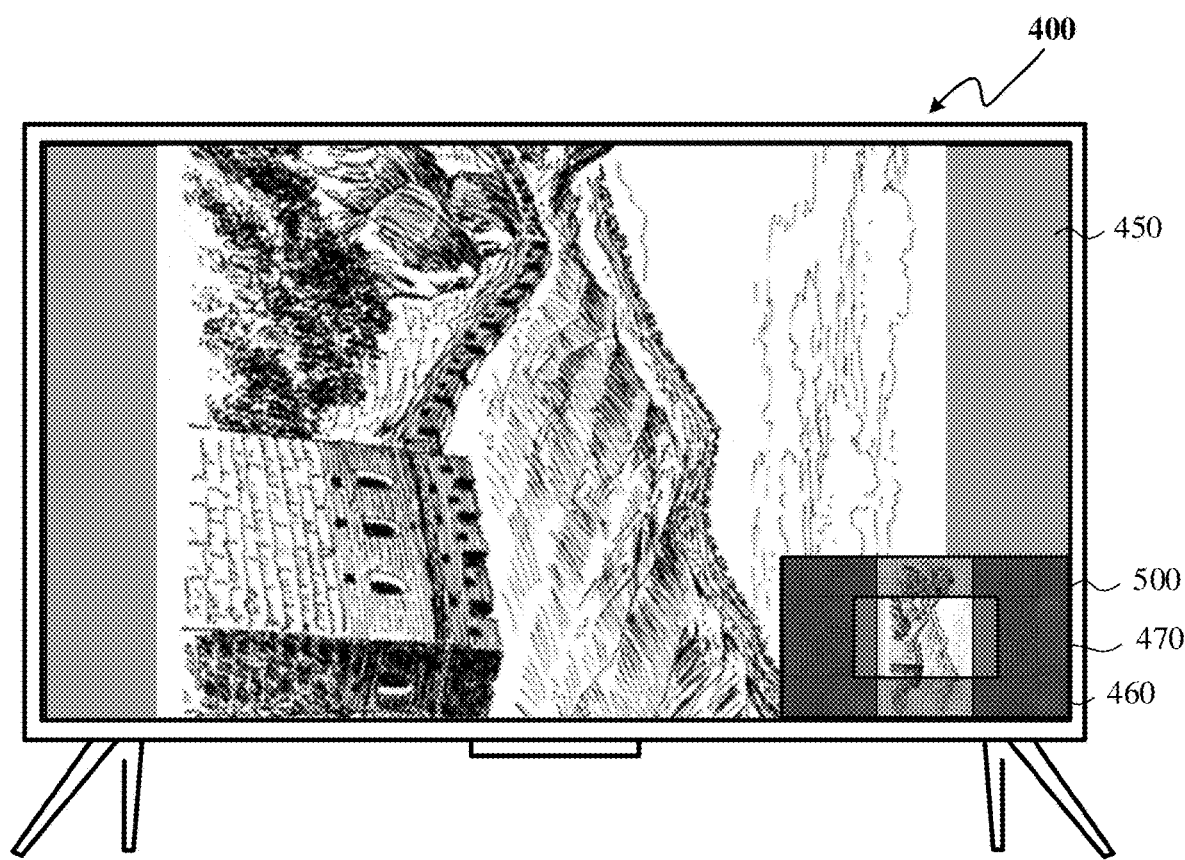
FIG. 13 illustrates a schematic diagram of the user interface after performing the rotation operation on an image according to some embodiments.

FIG. 13 illustrates a schematic diagram of a user interface after rotating an image in the image display area on the user interface shown in FIG. 7, and FIG. 14 illustrates a schematic diagram of the above-mentioned rotation process.

For the user interface shown in FIG. 7, when a remote controller is used to invoke a menu for controlling the image display, the function option for rotating 90 degrees clockwise is selected through the enlargement option in the menu. After the user presses the "confirm" key on the remote, the display apparatus responds upon receiving an instruction corresponding to the key on the remote controller, and the user interface after the response is as shown in FIG. 13. Here the image display area 400 displays the partial image 450 after the enlarged image is rotated 90 degrees anticlockwise; and the thumbnail show window 500 displays the thumbnail 460 that is rotated anticlockwise by 90 degrees, where the partial image 470 of the thumbnail is marked, and the size and position of the partial area 470 relative to the thumbnail 460 correspond to the size and position of the partial image 450 after the image 410 is enlarged and rotated relative to the whole image after the image 410 is enlarged and rotated.

The response process may, as shown in FIG. 14, include steps 1401-1404.

Step 1401: in response to receiving an instruction associated with a key on the remote controller, the UI of the display apparatus determines whether a monitor event corresponding to the instruction and a key value associated with the key have been registered; if it is determined the monitor event corresponding to the instruction and the key value have been registered, the flow goes to the subsequent steps, and if it is determined that a monitor event corresponding to the instruction and the key value have not been registered, the instruction will not be responded.

Step 1402: UI of the display apparatus determines the image displayed in the image display area after the rotation according to the rotation angle and rotation direction, and invokes the service support layer to refresh the image display area to display the rotated image.

Step 1403: the UI of the display apparatus rotates the image thumbnail in the thumbnail show window according to the rotation angle and rotation direction, and re-adjusts the width and height of the rotated thumbnail according to the height of the thumbnail frame in the thumbnail show window so that the width of the rotated thumbnail and the height of the thumbnail frame are equal, and adjusts the width and height of the display area of the image thumbnail accordingly.

In this step, the computed attribute of the Vue component detects that the image has been rotated, and then triggers the rotation of the image thumbnail in the first layer of the thumbnail show window as well as the calculations of the width and height of this thumbnail.

The UI of the display apparatus triggers the calculations of the width and height of the display area in the second layer of the thumbnail show window according to the calculated width and height of the thumbnail, to compress the display area according to the same compression ratio.

This function is implemented by using the Vue component. In some embodiments, the HTML tags and JavaScript control logics of two layers of the thumbnail show window may be encapsulated into a Vue component, and the v-if function provided by the Vue framework may control whether this function component is rendered in the browser page. When a user presses a remote control to set the rotation direction and rotation angle, the display apparatus UI will set the v-if value of this component to be true, and the browser will start rendering this component and invoke the function of the image thumbnail show window, to calculate the relevant attribute values in the HTML for the first layer and the second layer in the thumbnail show window.

After calculating the new width and height, the Vue component re-assigns the values to the CSS attributes for describing the width and height of the display area in the <div> tag of the first layer for the thumbnail show window, and then the browser re-renders the UI page of the display apparatus according to the tag change.

Step 1404: the UI of the display apparatus invokes the browser in the service support layer to refresh the thumbnail show window according to the calculated width and height of the thumbnail in the thumbnail show window, the rotation direction and rotation angle, and the width and height of the display area.

In this step, the UI modifies the CSS attribute values in the <dir> tags in the HTML tag language corresponding to the first and second layers according to the calculation result. After the browser is invoked, it parses the updated HTML tag language of the first and second layers, and renders the first and second layers of the thumbnail show window.

In some embodiments of the disclosure, when the image displayed in the image display area is an entire image rather than a partial image of the image, the thumbnail show window may be closed. In an example, when a user sends an instruction to zoom in an image until the entire image of the image can be fully displayed in the image display window, the thumbnail show window is closed. In another example, a user may send an instruction to restore the image for display on the display apparatus (for example, the user selects the "adaptive display" function option in the menu 42 in FIG. 7A through the remote), so that the entire image of the image can be displayed in the image display area. In this case, the display apparatus, in response to this instruction, displays the entire area after the image is restored on the display screen, and closes the thumbnail show window.

As can be seen from the embodiments described above, when the image of the media object exceeds the display area of the media object in the display screen of the display apparatus, the thumbnail show window shows the position and size of the partial image displayed currently in the display area of the media object in the whole image, to facilitate the user's next operation and thereby improve user experience.

Another embodiment of the disclosure further provides a non-transitory computer-readable storage medium storing the computer instructions thereon, which implement the method described in the embodiments described above when executed by a processor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display apparatus, comprising:
a display, configured to display a user interface, wherein the user interface is configured to present an image;
a controller in communication with the display, configured to cause the display apparatus to:
display an image on an image display area of the display;
during display of the image, in response to a user's selection of a menu for setting display of the image via a remote control, present a secondary menu of the menu, wherein the secondary menu comprises an option for enlarging the image;
in response to a user's selection of the option for enlarging the image via the remote control, obtain a current display frame of the image, present a first partial image of the current display frame of the image after enlargement on the image display area on a refreshed user interface, wherein the current display frame of the image after enlargement exceeds the image display area of the display;
wherein the refreshed user interface further comprises a thumbnail show window for indicating a position of the first partial image in the current display frame of the image after enlargement, and a first partial area of the thumbnail is marked for indicating the position of the first partial image in the current display frame of the image after enlargement;
wherein the first partial area of the thumbnail is presented in a display area of the thumbnail; and a remaining area of the thumbnail except for the display area is shown in a blocked area of the thumbnail, and the remaining area is semi-transparent;
wherein the thumbnail show window comprises a first layer and a second layer, and the first layer is partially covered by the second layer; and
wherein four direction indicators are displayed around four sides of the first partial area of the thumbnail on the second layer, wherein the four direction indicators are configured to indicate which direction the first partial image is able to move along.

2. The display apparatus according to claim 1, wherein the controller is further configured to:
present a second partial image of the current display frame after enlargement on a refreshed user interface in response to a user input for moving the current display frame of the image after enlargement; wherein a position of the second partial image in the current display frame is shifted from the position of the first partial image in the current display frame along a move direction;
wherein in the thumbnail show window on the refreshed user interface, a second partial area of the thumbnail is marked, and a position of the second partial area in the thumbnail is associated with the position of the second partial image in the current display frame after enlargement.

3. The display apparatus according to claim 1, wherein the secondary menu further comprises an option for rotating the image, and the controller is further configured to:
present a third partial image of the current display frame on a refreshed user interface in response to a user's selection of the option for rotating the image via the remote control; wherein a position of the third partial image in the current display frame is shifted from the position of the first partial image on the current display frame in a rotation direction associated with the user's selection of the option for rotating the image;

wherein in the thumbnail show window on the refreshed user interface, a third partial area of the thumbnail is marked, and a position of the third partial area in the thumbnail is associated with the position of the third partial image in the current display frame.

4. The display apparatus according to claim 1, wherein the second layer is set to be opaque or semi-transparent.

5. The display apparatus according to claim 1, wherein the controller is further configured to:
in response to a user input for enlarging or moving the image, determine at least one of width, height and position of the display area in the thumbnail show window corresponding to the user input;
update at least one of attribute values for describing the width, height and position of the display area in page files of the second layer, according to the at least one of the width, height and position of the display area;
refresh and display the second layer in the thumbnail show window according to the page files of the second layer.

6. The display apparatus according to claim 5, wherein the controller is further configured to: in response to a user input for rotating the image, determine a width and a height of a thumbnail to be rotated to, to make the width adapt to a height of the thumbnail show window; update attribute values for describing the width and height of the thumbnail in page files of the first layer according to the width and height; refresh and display the first layer in the thumbnail show window according to the page files of the first layer.

7. The display apparatus according to claim 6, wherein the controller is further configured to determine a width and a height of a thumbnail to be rotated to, to make the width adapt to a height of the thumbnail show window by:
determining the width and height of the thumbnail to be rotated to, and determining the width and height of the display area in the thumbnail show window, to make a scaling proportion of the width and height of the display area be equal to a scaling proportion of the width and height of the thumbnail.

8. The display apparatus according to claim 1, wherein the controller is further configured to:
in response to a user input for moving the current display frame of the image after enlargement, determine whether a first edge of the current display frame of the image has reached an edge of the image display area of the display;
in response to the first edge of the current display frame of the image having reached the edge of the image display area, cause a first direction indicator of the four direction indicators corresponding to the first edge to disappear;
in response to the first edge of the current display frame having not reached the edge of the image display area, present the four direction indicators around four sides of a second partial area.

9. A display method for a display apparatus, comprising:
displaying an image on an image display area of a display of the display apparatus;
during display of the image, in response to a user's selection of a menu for setting display of the image via a remote control, presenting a secondary menu of the menu, wherein the secondary menu comprises an option for enlarging the image;
in response to a user's selection of the option for enlarging the image via the remote control, obtaining a current display frame of the image and presenting a first partial image of the current display frame of the image after enlargement on the image display area on a refreshed user interface, wherein the current display frame of the image after enlargement exceeds the image display area of the display;
wherein the refreshed user interface further comprises a thumbnail show window for indicating a position of the first partial image in the current display frame of the image after enlargement, and a first partial area of the thumbnail is marked for indicating the positon of the first partial image in the current display frame of the image;
wherein the first partial area of the thumbnail is presented in a display area of the thumbnail; and a remaining area of the thumbnail except for the display area is shown in a blocked area of the thumbnail, and the remaining area is semi-transparent;
wherein the thumbnail show window comprises a first layer and a second layer, and the first layer is partially covered by the second layer; and
wherein four direction indicators are displayed around four sides of the first partial area of the thumbnail on the second layer, wherein the four direction indicators are configured to indicate which direction the first partial image is able to move along.

10. The method according to claim 9, wherein the method further comprises:
presenting a second partial image of the current display frame after enlargement on a refreshed user interface in response to a user input for moving the current display frame of the image after enlargement; wherein a position of the second partial image in the current display frame is shifted from the position of the first partial image in the current display frame in a move direction;
wherein in the thumbnail show window on the refreshed user interface, a second partial area of the thumbnail is marked, and a position of the second partial area of the thumbnail in the thumbnail is associated with the position of the second partial image in the current display frame.

11. The method according to claim 9, wherein the secondary menu further comprises an option for rotating the image, and the method further comprises:
presenting a third partial image of the current display frame on a refreshed user interface in response to a user's selection of the option for rotating the image via the remote control; wherein a position of the third partial image in the current display frame is shifted from the position of the first partial image in the current display frame along a rotation direction associated with the user's selection of the option for rotating the image;
wherein in the thumbnail show window on the refreshed user interface, a third partial area of the thumbnail is marked, and a position of the third partial area in the thumbnail is associated with the position of the third partial image in the current display frame.

12. The method according to claim 9, wherein the method further comprises:
in response to a user input for enlarging or moving the image, determining at least one of width, height and position of the display area in the thumbnail show window corresponding to the user input;

updating at least one of attribute values for describing the width, height and position of the display area in page files of the second layer according to the at least one of the width, height and position of the display area;

refreshing and displaying the second layer in the thumbnail show window according to the page files of the second layer.

13. The method according to claim 12, the method further comprises: in response to a user input for rotating the image, determining a width and a height of a thumbnail to be rotated to, to make the width of the rotated thumbnail adapt to a height of the thumbnail show window; updating attribute values for describing the width and height of the thumbnail in page files of the first layer according to the determined width and height; refreshing and displaying the first layer in the thumbnail show window according to the page files of the first layer.

14. The method according to claim 13, wherein said determining at least one of width, height and position of the display area in the thumbnail show window comprises:

determining the width and height of the thumbnail to be rotated to, and determining the width and height of the display area in the thumbnail show window, to make a scaling proportion of the width and height of the display area be equal to a scaling proportion of the width and height of the thumbnail.

15. The display method according to claim 9, wherein the method further comprises:

in response to a user input for moving the current display frame of the image after enlargement, determining whether a first edge of the current display frame of the image has reached an edge of the image display area of the display;

in response to the first edge of the current display frame of the image having reached the edge of the image display area, causing a first direction indicator of the four direction indicators corresponding to the first edge to disappear;

in response to the first edge of the current display frame having not reached the edge of the image display area, presenting the four direction indicators around four sides of a second partial area.

\* \* \* \* \*